United States Patent
Kong et al.

(10) Patent No.: US 11,177,940 B2
(45) Date of Patent: Nov. 16, 2021

(54) METHOD OF EVIDENCING EXISTENCE OF DIGITAL DOCUMENTS AND A SYSTEM THEREFOR

(71) Applicant: 707 Limited, Central (HK)

(72) Inventors: Johnson Zone An Kong, Tai Po (HK); Michael Ming-Jae Lin, Pok Fu Lam (HK); Ronald Ker Wei Yu, FanlingNT (HK); Ken Yip, Central (HK)

(73) Assignee: 707 Limited, Central (HK)

( * ) Notice: Subject to any disclaimer, the term of this patent is extended or adjusted under 35 U.S.C. 154(b) by 0 days.

(21) Appl. No.: 16/622,824

(22) PCT Filed: Jun. 19, 2018

(86) PCT No.: PCT/CN2018/091833
§ 371 (c)(1),
(2) Date: Dec. 13, 2019

(87) PCT Pub. No.: WO2018/233603
PCT Pub. Date: Dec. 27, 2018

(65) Prior Publication Data
US 2020/0382277 A1 Dec. 3, 2020

Related U.S. Application Data

(63) Continuation of application No. PCT/CN2018/091833, filed on Jun. 19, 2018.

(30) Foreign Application Priority Data

Jun. 20, 2017 (HK) ................................ 17106138.1

(51) Int. Cl.
*H04L 9/06* (2006.01)
*G06F 21/60* (2013.01)
(Continued)

(52) U.S. Cl.
CPC .......... *H04L 9/0637* (2013.01); *G06F 21/602* (2013.01); *G06F 21/64* (2013.01);
(Continued)

(58) Field of Classification Search
CPC ... H04L 9/0637; H04L 9/0643; H04L 9/0894; H04L 9/3297; H04L 2209/38; G06F 21/602; G06F 21/64
See application file for complete search history.

(56) References Cited

U.S. PATENT DOCUMENTS 8,892,532 B2    11/2014  Sögtrop
9,443,108 B1 *   9/2016  Roth ..................... H04L 9/3239
(Continued)

FOREIGN PATENT DOCUMENTS

CN    102479297 A    5/2012
CN    105335098 A    2/2016
(Continued)

OTHER PUBLICATIONS

Wang Zhen, "Safety Analysis of Digital Signature Solution with Time-Stamp," Modern Computer (professional version), Oct. 30, 2014, pp. 87-89.
(Continued)

*Primary Examiner* — Michael R Vaughan
(74) *Attorney, Agent, or Firm* — Blueshift IP, LLC; Robert Plotkin

(57) ABSTRACT

A computer-implemented method for evidencing the existence of a digital document has the steps of obtaining one or a plurality of time stamp(s) of the digital document, obtaining one or a plurality of cryptographic hash(es) of the digital document, generating one or a plurality of evidence key(s) based on the time stamp(s) and the cryptographic hash(es), and storing the evidence key(s) to provide one or a plurality of stored evidence key(s). A computer system for evidencing the existence of a digital document is also provided. A computer-implemented tag chain system is also described.

20 Claims, 10 Drawing Sheets

(51) Int. Cl.
*G06F 21/64* (2013.01)
*H04L 9/08* (2006.01)
*H04L 9/32* (2006.01)

(52) U.S. Cl.
CPC .......... *H04L 9/0643* (2013.01); *H04L 9/0894* (2013.01); *H04L 9/3297* (2013.01); *H04L 2209/38* (2013.01)

(56) References Cited

U.S. PATENT DOCUMENTS

| | | | |
|---|---|---|---|
| 9,679,276 | B1 | 6/2017 | Cuende |
| 2014/0136838 | A1 | 5/2014 | Mossbarger |
| 2016/0212146 | A1* | 7/2016 | Wilson .................. H04L 9/3226 |
| 2018/0101684 | A1* | 4/2018 | Murphy .................. G06F 21/62 |
| 2018/0181909 | A1* | 6/2018 | Wilkinson .......... G06Q 10/0833 |
| 2018/0285996 | A1* | 10/2018 | Ma ........................ G06F 16/2428 |
| 2018/0341701 | A1* | 11/2018 | Verma .................. G06F 16/3344 |
| 2020/0099534 | A1* | 3/2020 | Lowagie ............... H04L 9/3263 |
| 2020/0244470 | A1* | 7/2020 | Ruckriemen ......... H04L 9/3236 |

FOREIGN PATENT DOCUMENTS

| | | |
|---|---|---|
| CN | 106330465 A | 1/2017 |
| CN | 106611135 A | 5/2017 |
| CN | 106775619 A | 5/2017 |
| CN | 107169865 A | 9/2017 |
| CN | 107679857 A | 2/2018 |
| EP | 09409452 | 9/1999 |
| JP | 2007256756 A | 10/2007 |
| JP | 2016218554 A | 12/2016 |

OTHER PUBLICATIONS

Search Report dated Jun. 27, 2017, in Hong Kong Patent Application No. 17106138.1.
Online Digital Timestamp Service offered by the Korean Trade Secret Protection Center, Copyright 2012, 2 pages. Available only online at <<https://www.tradesecret.or.kr/main.do>>.
Timestamp Token Certificate Service offered by the National Industrial Property Info & Training Center to Protect Trade Secrets, Copyright 2004-2020 by INPIT, 2 pages. Available online only at <<https://www.inpit.go.jp/english/utili/tstcs_top.html>>.
"Digital Timestamping—Frequently Asked Questions," DigiStamp, Copyright 1999-2020 to DigiStamp, Inc. Available online only at <<https://www.digistamp.com/support/frequently-asked-questions>>.
"Time Stamping Authority," Copyright 2020 by Safe Stamper TSA, 2 pages. Available online only at <<https://safestamper.com/tsa>>.
"Time Stamp and Time Stamping Service," SwissSign AG, Dec. 18, 2013, 6 pages. Available online only at <<https://www.swisssign.com/en/Signing/time-stamping-service.html>>.
"Sterling B2B Integrator 5.2.0: Timestamp Utility Service," IBM Knowledge Center, original date of publication unknown, 6 pages. Available online only at <<https://www.ibm.com/support/knowledgecenter/SS3JSW_5.2.0/com.ibm.help.svcs_adpts_m_z.doc/Timestamp_Utility_svc.html>>.
"Time Stamping Authenticode Signatures," Windows Dev Center, Microsoft Authenticode, May 31, 2018, 6 pages. Available online only at <<https://docs.microsoft.com/en-us/windows/win32/seccrypto/time-stamping-authenticode-signatures>>.
Extended European Search Report dated Jun. 9, 2020, in European Patent Application No. 18821376.3, 9 pages.
Andreas M Antonopoulos, "Mastering Bitcoin—Unlocking Digital Crypto-Currencies," O'Reilly, Dec. 1, 2014, pp. 1-282, XP055581333. Available online at <<https://unglueit-files.s3.amazonaws.com/ebf/05db7df4f31840f0a873d6ea14dcc28d.pdf>>.
International Search Report & Written Opinion dated Sep. 14, 2018 in International Patent Application No. PCT/CN2018/091833, 7 pages.
Alex Boverman, "Timejacking & Bitcoin," May 25, 2011, XP055768058. Accessed Jan. 22, 2021, 5 pages. Available online at <<URL:http://culubas.blogspot.com/2011/05/timejacking-bitcoin_802.html>>.
Communication pursuant to Article 94(3) EPC dated Jan. 29, 2021, in European Patent Application No. 18821376.3, 7 pages.

\* cited by examiner

METHOD OF EVIDENCING EXISTENCE OF DIGITAL DOCUMENTS AND A SYSTEM THEREFOR

FIELD OF THE INVENTION

The present invention relates to a method of evidencing the existence of a digital document and a time/date stamp therefor. The present invention also relates to a method and/or system for retrieving evidence of the digital document. The present invention also relates to a blockchain system.

BACKGROUND OF THE INVENTION

In today's knowledge economy, Intellectual Property (IP) is often a person's or company's most valuable asset. IP laws were designed to benefit society by encouraging the creation of new, valuable IP by recognizing creators, owners and/or inventors and by offering them legal and economic benefits. One of the critical prerequisites to all IP rights (IPRs) is originality. Having said that, it is often important to know when IP was created and/or first used; and who is the creator, owner or inventor.

One method to prove originality and/or creation is by a digital "birth certificate." As soon as the creator, owner or inventor creates a new digital work (whether as an image, video, document, song, etc.), a new trade secret, a new copyrightable work, a new design for a new trademark logo, and/or the genesis of a new invention and saves it digitally, a digital birth certificate consisting of and/or associated with a time stamp may be provided. However, relying simply upon the time stamp of the computer upon which the digital document was created is often insufficient as such time/date stamps may be changed forged, or simply incorrect if they rely upon the computer's time alone.

Blockchain systems are known which employ cryptographic hashes to record and create links, such as transactions and/or other data, which is then stored on a ledger, typically either an open ledger or a closed ledger, although semi-open ledgers are also possible. However, a common problem with blockchain systems is that as their chains become longer and longer, then their systems require more and more time, computing power, and energy to generate the next virtual link in the chain. At a certain point, the law of diminishing returns indicates that the generation of the next link in the chain will become either too slow, energy intensive, and/or otherwise unsustainable. Accordingly, there is a need to improve the current blockchain system architecture.

Therefore, it is desirable to be able to provide a method that can quickly and easily provide a time and date stamp and digital certificate, such as a digital fingerprint, to evidence the new creation, possession and/or the genesis of a digital document. Preferably, such a method provides a temporal record uniquely identifying the digital file without exposing the actual digital content in any way. It is also desirable that such a record be securely stored, preferably with a trusted organization, and/or have a standardized time stamp. It is also desirable to provide a unique digital fingerprint for each digital document. It is also desirable to be able to detect whether the digital document has been altered or changed from the digital document which is indicated by the digital fingerprint. The need also exists for an easier and more efficient method for authenticating a digital document, especially in court or other tribunal, for cases of trade secret theft, prior use defenses, copyright actions, and the like. The need also exists for an improved blockchain system.

SUMMARY OF THE INVENTION

In the light of the foregoing it is an object of the present invention to provide an improved computer-implemented method, and a computer system therefor, to evidence the existence, i.e., to provide "proof of existence," of a digital document. The present invention relates to a computer-implemented method for evidencing the existence of a digital document having the steps of obtaining a time stamp of the digital document, obtaining a plurality of cryptographic hashes of the digital document, generating an evidence key based on the time stamp and the plurality of cryptographic hashes, and storing the evidence key to provide a stored evidence key.

The present invention also relates to a computer-implemented method for evidencing the existence of a digital document having the steps of obtaining a plurality of time stamps of the digital document, obtaining a cryptographic has of the digital document, generating an evidence key based on the plurality of time stamps and the cryptographic hash, and storing the evidence key to provide a stored evidence key.

The present invention also relates to a computer-implemented method for evidencing the existence of a digital document having the steps of obtaining a time stamp of the digital document, obtaining a cryptographic hash of the digital document, generating an evidence key based on the time stamp and the cryptographic hash, and storing the evidence key to provide a stored evidence key. The storing of the evidence key is stored on a plurality of storage media.

The present invention also includes a computer system for evidencing the existence of a digital document containing the methods described herein.

Without intending to be limited by theory, it is believed that the present invention may provide an improved computer-implemented method of evidencing the existence, i.e., "proof of existence," of a digital document, such as a photograph, a script, an essay, etc. Furthermore, it is believed that by employing a cryptographic hash, a time stamp, an evidence key and/or a storage media, the evidencing method herein may possess one or more benefits such as improved security, speed, computing efficiency, safety, etc. It is believed that in some cases, the evidence key and/or evidence provided by the method herein may be used in, for example, a court of law, an arbitration, a mediation, etc. as a presumption that the digital document was in existence at a specific time. It is also believed that in some cases, the evidence key and/or evidence provided by the method herein may be used in, for example, a court of law, an arbitration, a mediation, etc. as a presumption that the digital document was in the possession of a certain person and/or organization at a specific time.

It is also believed that such a computer-implemented method and computer system may be useful for evidencing the existence of, for example, personal digital documents, legal digital documents, corporate digital documents, commercial digital documents, etc. and a combination thereof. It is believed that the present invention is particularly useful to evidence the existence of, digital documents such as, for example, wills, trust documents, corporate documents, websites, text or other electronic messages, contracts, deeds, assignments, sales contracts, receipts, advertising, invention notes, experimental data, data logs, telephone logs, financial transactions, patents, trademarks, copyrights, trade secrets, insurance records, patient records, computer programs, computer software, photographs, videos, music, experimental reports, etc., and/or their modifications and/or amendments.

The present invention also relates to a computer-implemented tag chain system containing a first chain, and a second chain. The first chain and the second chain are mutually-exclusive.

Without intending to be limited by theory, it is believed that a tag chain system allows the blockchain system to extend itself to encompass additional checksums, transactions, etc. while maintaining the needed speed, reducing time, overall energy requirements, etc.

BRIEF DESCRIPTION OF THE DRAWINGS

For a more complete understanding of the present invention, reference is made to the following detailed description and accompanying drawings, in which.

DETAILED DESCRIPTION OF THE INVENTION

As used herein, the term "comprising" means including the following elements but not excluding others.

As used herein, the terms "couple" or "connect" refers to electrically-coupling or connecting either directly or indirectly via one or more electrical or wireless methods, unless otherwise stated.

As used herein, the phrase "digital document" indicates any document that is stored digitally, rather than in a physical form. However, one skilled in the art understands that the digital document herein may be the digital representation of a physical document. Furthermore, it is recognized that the digital document itself may actually contain one or more digital files; for example, the digital document herein may be a database with multiple digital files therein, a folder with multiple digital files therein, an entire hard drive with multiple digital files herein, a server with multiple databases therein, etc.

As used herein, "time" indicates the time as well as the date or an associated value which corresponds to a specific time and date.

The present invention relates to a computer-implemented method for evidencing the existence of a digital document having the steps of obtaining a time stamp of the digital document, obtaining a plurality of cryptographic hashes of the digital document, generating an evidence key based on the time stamp and the plurality of cryptographic hashes, and storing the evidence key to provide a stored evidence key.

The present invention also relates to a computer-implemented method for evidencing the existence of a digital document having the steps of obtaining a plurality of time stamps of the digital document, obtaining a cryptographic has of the digital document, generating an evidence key based on the plurality of time stamps and the cryptographic hash, and storing the evidence key to provide a stored evidence key.

The present invention also relates to a computer-implemented method for evidencing the existence of a digital document having the steps of obtaining a time stamp of the digital document, obtaining a cryptographic hash of the digital document, generating an evidence key based on the time stamp and the cryptographic hash, and storing the evidence key to provide a stored evidence key. The storing of the evidence key is stored on a plurality of storage media.

Figure 1:
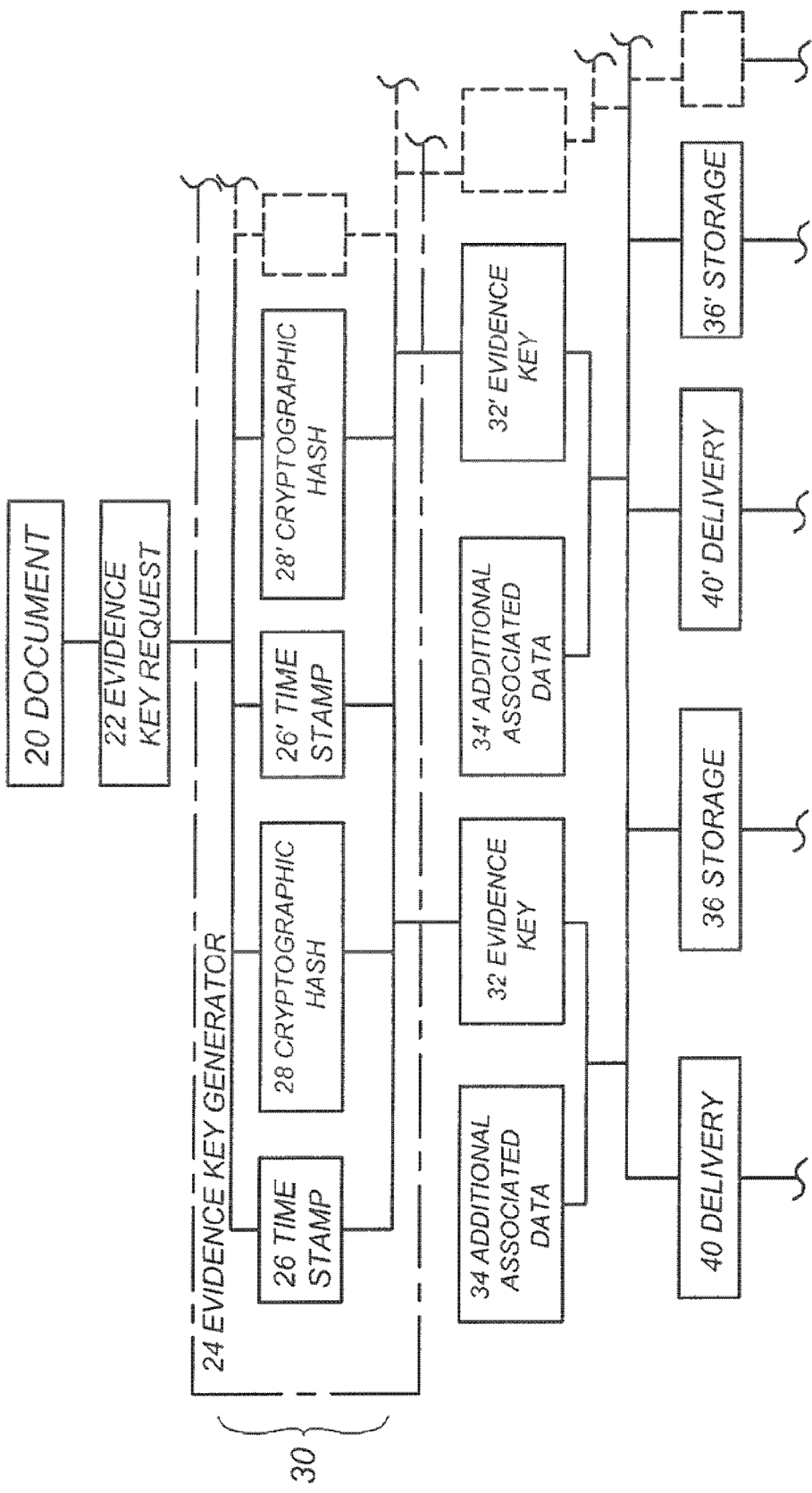
FIG. 1 shows a diagram of embodiment of the present invention.

Turning to the figures, FIG. 1 shows a diagram of an embodiment of the present invention. In FIG. 1, a method, 10, begins with a document, 20, for which an evidence key request, 22, is submitted by, for example, a user, a computer, a system, etc. The evidence key request, 22, may be sent to, an evidence key generator, 24, which is typically a computer program and/or algorithm housed in, for example, a server, a browser, an application, etc. The evidence key generator, 24, then obtains (e.g., generates) one or more time stamps, 26, and obtains (e.g., generates) one or more cryptographic hashes, 28, depending on the embodiment of the invention herein.

The evidence key generator, 24, may employ various methods and input, 30, to generate the evidence key, 32. In an embodiment herein the evidence key generator, 24, then generates one or more evidence keys, 32, based upon the inputs, 30, of the time stamp(s), 26, and/or the cryptographic hash(es), 28; or based upon the time stamp(s), 26, and the cryptographic hash(es), 28. In an embodiment herein, the evidence key generator employs a plurality of time stamps, such as 26 and 26', and the cryptographic hash, 28, to generate an evidence key, 32. In an alternate embodiment, the evidence key generator, 24, employs the time stamp, 26, and a plurality of cryptographic hashes, 28 and 28', to generate an evidence key, 30. In yet another embodiment, the evidence key generator, 24, employs a plurality of time stamps, 26 and 26', as well as a plurality of cryptographic hashes, 28, to generate the evidence key, 30. In yet another embodiment, the evidence key generator, 24, generates multiple evidence keys, 32 and 32', with the same, or different inputs, 30.

The time stamp herein may come from a variety of sources and may be generated according to one or multiple events. In an embodiment herein, the time stamp pertains to the time when the digital document was first created. In an embodiment herein, the time stamp pertains to the time when the digital document was last saved. Thus, in an embodiment herein the time stamp may be part of a version-tracking program for digital documents.

In an embodiment herein, the time stamp pertains to the time when the request of generating an evidence key is received by the evidence key generator. In an embodiment herein, the time stamp pertains to the time when the time when the evidence key generator obtains the cryptographic hash. In another embodiment herein, the time stamp is obtained from a time source such as a time server, an independent clock, and a combination thereof; or a time server, an independent clock, and a combination thereof.

In an embodiment herein the independent clock is a Global Positioning System (GPS) clock.

In an embodiment herein, the time stamp is a plurality of time stamps; or from about 2 time stamps to about 10 time stamps; or from about 2 time stamps to about 8 time stamps; or from about 3 time stamps to about 6 time stamps. In an embodiment herein, the plurality of time stamps are obtained from different time sources, as described herein; or each of the plurality of time stamps is obtained from a different time source. Without intending to be limited by theory it is believed that such a feature allows greater confidence in the reliability of the entire system when, for example, the evidence key is produced to a third party for evidencing the existence of the digital document at a specific time.

In an embodiment herein the time stamp includes a plurality of time stamps pertaining to a plurality of events; or a plurality of time stamps each of which pertains to a different event. In an embodiment herein, the time stamp pertains to a plurality of different events such as the time when the digital document was first created, the time when the digital document was last saved, the time when the request of generating an evidence key is received by the evidence key generator, the time when the evidence key generator obtains the cryptographic hash, and a combination thereof.

Furthermore, in an embodiment of the present invention, if the plurality of time stamps do not all fall within a pre-determined amount of time, then the evidence key is flagged by the evidence key generator, another algorithm, or another process, as a possible error. In an embodiment herein, the pre-determined amount of time is 10 minutes; or 5 minutes; or 2 minutes.

The cryptographic hash herein is a code; or an alphanumeric code string, which represents the data in the digital document. A cryptographic hash function maps the data in the digital document to provide a specific cryptographic hash for that specific document. The cryptographic hash function herein may be a keyed cryptographic hash generated by a keyed cryptographic hash function or an unkeyed cryptographic hash generated by an unkeyed cryptographic hash function. In an embodiment herein the keyed cryptographic has function is selected from the group of VMAC, UMAC, BLAKE 2, Poly1305-AES, PMAC, SipHash, One-Key MAC, MD6, HMAC (hash-based message authentication code), and a combination thereof; or and a combination thereof; or BLAKE 2, MAC, HMAC, and a combination thereof.

In an embodiment herein, the unkeyed cryptographic has function is selected from the group of BLAKE-256, BLAKE-512, BLAKE2b, BLAKE2s, ECOH, GOST, Grøstl, HAS-160, HAVAL, JH, MD2, MD4, MD5, MD6, Radio-Gatún, RIPEMD, RIPEMD-128, RIPEMD-160, RIPEMD-320, SHA-1, SHA-224, SHA-256, SHA-384, SHA-512, SHA-3, Skein, Snefru, Spectral Hash, Streebog, SWIFFT, Tiger, Whirlpool, and a combination thereof; or an unkeyed cryptographic hash function selected from the group consisting of SHA-1, SHA-224, SHA-256, SHA-384, SHA-512, SHA-3, and a combination thereof; or an unkeyed cryptographic hash function selected from the group consisting of SHA2-256, SHA2-512, SHA3-256, SHA-3, and a combination thereof.

In an embodiment herein, the cryptographic hash; or plurality of cryptographic hashes is from about 2 to about 100 cryptographic hashes; or from about 2 to about 25 cryptographic hashes; or from about 3 to about 10 cryptographic hashes; or from about 4 to about 8 cryptographic hashes. In an embodiment herein, each of the cryptographic hashes is generated by a different cryptographic hash function. Without intending to be limited by theory, it is believed that the combination of multiple cryptographic hashes provides greater assurance that a collision does not, or will not, occur. One skilled in the art understands that when multiple cryptographic hashes are used, then the chances of a collision decrease exponentially.

Without intending to be limited by theory, it is believed that the use of a cryptographic hash herein, as opposed to other types of hashes, is particularly useful because from the cryptographic hash itself it is extremely difficult, if not impossible, to reconstruct (i.e., reverse-engineer) the digital (i.e., electronic) document and/or the content of the digital document. Thus, just like it is impossible to reverse-engineer a person from a fingerprint, it is impossible to reverse-engineer the digital document from the digital fingerprint. Accordingly, it is believed that with such a benefit, the present invention may be useful in evidencing the existence of trade secrets, while simultaneously reducing the risk of exposure of the trade secret.

The evidence key may be generated with the cryptographic hash(es) and the time stamp(s); or with the cryptographic hash(es), the time stamp(s), and additional input(s). The evidence key may be generated by associating these inputs together or by further modifying them/altering them as desired. For example, in an embodiment herein the cryptographic hash(es), the time stamp(s), and any additional input(s) are further fed into a further hash function to generate a further hash which is then used as the evidence key, either alone or with further data.

Without intending to be limited by theory, it is believed that by using both the cryptographic hash(es) and the time stamp(s) to generate the evidence key it provides greater confidence that one or more of these inputs was not altered at a later time.

As can be seen in FIG. 1, although only two time stamps, 26 and 26', two cryptographic hashes, 28 and 28', and two evidence keys, 32 and 32', etc. are specifically shown, the dotted lines and boxes on the right side of FIG. 1 indicates that additional time stamps, cryptographic hashes, evidence keys, etc. may also be provided, obtained, generated, etc. and such additional features are considered to be within the scope of the invention. Thus, it is clear from FIG. 1 that a single digital document may lead to the generation of a plurality of time stamps, a plurality of cryptographic hashes, a plurality of evidence keys, a plurality of stored evidence keys, etc.

The evidence key, 32, and any optional additional associated data, 34, is then stored together in storage(s), 36, which typically include placing the evidence key and the additional associated data together in a storage media. The additional associated data herein may be included with and/or associated with the evidence key so as to, for example, categorize the evidence key, explain the evidence key, help retrieve the evidence key at a later point in time, help authenticate the evidence key, etc. In an embodiment herein, the additional associated data contains data used to categorize the evidence key. In an embodiment herein, the additional associated data includes a software version number for the version of the software which was used to generate the evidence key. In an embodiment herein, the additional associated data contains data used to search for the evidence key, typically at a time after the storage thereof.

In an embodiment herein the additional associated data contains non-sensitive information, such as information about the evidence key which helps to explain the evidence key, the content thereof, etc., but without actually exposing the detailed contents of the digital document itself. In an embodiment herein, the additional associated data allows the searching of the evidence key using non-sensitive information; or the searching of the evidence key using only non-sensitive information. The additional associated data may be, for example, a storage time stamp (indicating the time that the evidence key was stored), a unique identifier (e.g., an email address, a telephone number, a user name, a password, a server address, an IP address, a device address, etc.), a file name, and a combination thereof; or a storage time stamp, an email address, a telephone number, a user name, a password, a file name, and a combination thereof; or a storage time stamp, an email address, a telephone number, a user name, a file name, a unique identifier, and a combination thereof.

In an embodiment herein, the additional associated data may be viewed, searched, organized, categorized, etc. by an entity such as, for example, the system administrator, a local administrator, a registered user, and/or the public. In an embodiment herein, different levels and/or categories of entities possess different levels of access permission with respect to the additional associated data and/or the evidence key. For example, a system administrator may have full access permission to view, search, organize, categorize, etc. the additional associated data and the evidence key, whereas the public may only have limited access permission to view only the additional associated data.

In an embodiment herein, no entity at any level has access which allows them to change the additional associated data or the evidence key.

In an embodiment herein, if any change is made to the additional associated data and/or the evidence key, then it is indicated in a log; or a permanent log. In an embodiment herein, the log herein includes a record of the change that is made, as well as one or more indications of, for example, the entity making the change, the date and time the change is made, the location (either physical location and/or the virtual location, via, for example, an IP address) from which the change is made, the access permission needed to make the change, etc.

The password useful herein may be any type of information to identify and/or authenticate a particular user, server, or other entity, particularly one which submits an evidence key request for the original digital document. In an embodiment herein the password is selected from the group of an alphanumeric string, a personal identification factor, a location, a picture, an electronic file, and a combination thereof or an alphanumeric string, a personal identification factor, a picture, and a combination thereof or an alphanumeric string, a personal identification factor, and a combination thereof. In an embodiment herein the personal identification factor is a biometric factor such as a fingerprint, a voice print, facial recognition authentication, other personalized pattern, and a combination thereof; or a fingerprint, a voice print, facial recognition authentication, and a combination thereof. The biometric factor herein may comprise biometric information. In an embodiment herein the personal identification factor employs a facial recognition algorithm.

In an embodiment herein, the additional associated data useful herein is case sensitive. In an embodiment herein, the additional associated data useful herein is not case sensitive. In an embodiment herein, the password, file name, IP address, etc. is case-sensitive. In an embodiment herein, the password, file name, IP address, etc. is not case-sensitive.

In FIG. 1, it can be seen that the evidence key, 23, and the additional associated data, 34, are combined and stored together in the storage, 36, 36', etc. so as to provide one or more stored evidence keys, 38, 38', etc. The storage herein employs a storage media; or a plurality of storage media, to store the stored evidence key(s). The information such as the evidence key, 32, and the additional associated data, 34, is typically stored in a database in the storage, 36, 36', etc. and/or the storage media herein.

The storage media useful herein include those selected from the group of a server, a storage drive, paper, a CD-ROM, a DVD, a single-use storage media, and a combination thereof; or a server, a storage drive, a CD-ROM, a DVD, a single-use storage media, and a combination thereof; or a server, a storage drive, a CD-ROM, a DVD, and a combination thereof. In an embodiment herein the storage drive is selected from the group of a disk drive, a flash memory, a magnetic tape, and a combination thereof; or a hard disk, a floppy disk, a magneto-optical disk, a flash memory, a magnetic tape, and a combination thereof; or a hard disk, a flash memory, and a combination thereof.

In an embodiment herein, the method and/or system herein comprises a plurality of storage media.

In an embodiment herein, the plurality of storage media; or each of the plurality of storage media, is located in a different physical location. Without intending to be limited by theory, it is believed that such a dispersed system provides business continuity and disaster-control benefits in case of events such as, for example, natural disasters, power outages, war, political unrest, etc. Furthermore, in an embodiment herein, one or more of the plurality of storage media is held by an organization such as a trusted organization; or a trusted international organization; or a non-partisan organization; or a non-profit organization; or a social enterprise. In an embodiment herein, the organization is selected from the group consisting of The Austrian Patent Office (APO), The China Council for the Promotion of International Trade (CCPIT), The European Patent Office (EPO), The Intellectual Property Office of Singapore (IPOS), The International Intellectual Property Commercialization Council (IIPCC), The State Intellectual Property Office (SIPO, a.k.a. The Chinese Intellectual Property Office), The Swiss Federal Institute of Intellectual Property (FIIP), the United States Patent and Trademark Office (USPTO), The State Market Supervision Administration (SMSA in China), The World Intellectual Property Office (WIPO), the United States Library of Congress, and a combination thereof or The Intellectual Property Office of Singapore (IPOS), The International Intellectual Property Commercialization Council (IIPCC), The World Intellectual Property Office (WIPO), the United States Library of Congress, The State Market Supervision Administration (SMSA in China), and a combination thereof. In the case where an organization either changes its name, as merged, absorbed, divested, etc., then the term "organization" as used herein includes their respective successor(s) in interest.

In an embodiment herein, the plurality storage media herein are electronically-separated and physically-separated from each other. Without intending to be limited by theory, it is believed that such a system provides improved security and reliability as compared to a comparable inter-networked system and/or a system having only a single physical location. Such a system dispersed to multiple locations may also provide a reliable backup in case, for example, one of the locations is hacked, altered, held for ransom, etc.

In FIG. 1 it can be seen that in an embodiment herein, the method may include a delivery step, 40, 40', etc., in which the evidence key, 32, and/or the additional associated data, 43, is delivered to a party; or is delivered to the party, organization, server, account, etc. that originally made the evidence key request, 22, to form a delivered evidence key, 42, 42', etc. In an embodiment herein, the delivery step, 40, includes the delivery of the evidence key, 32, and additional associated data, 34, to the account that originally made the evidence key request, 22. Such a delivery may be via a route such as, for example, email, text message, electronic messaging service, postal mail, transmission over the interne, and a combination thereof; or via email, postal mail, text message, and a combination thereof. Without intending to be limited by theory, it is believed that such a delivery will help to increase the likelihood that, in the case that retrieval is requested, the requester will be able to provide sufficient information to be able to successfully retrieve the stored evidence key.

In FIG. 1 the storage, 36', is shown as being in parallel with storage 36. However, in an embodiment of the present invention, the storage, 36', is in sequence with storage 36 (see, for example, FIG. 3).

Figure 2:
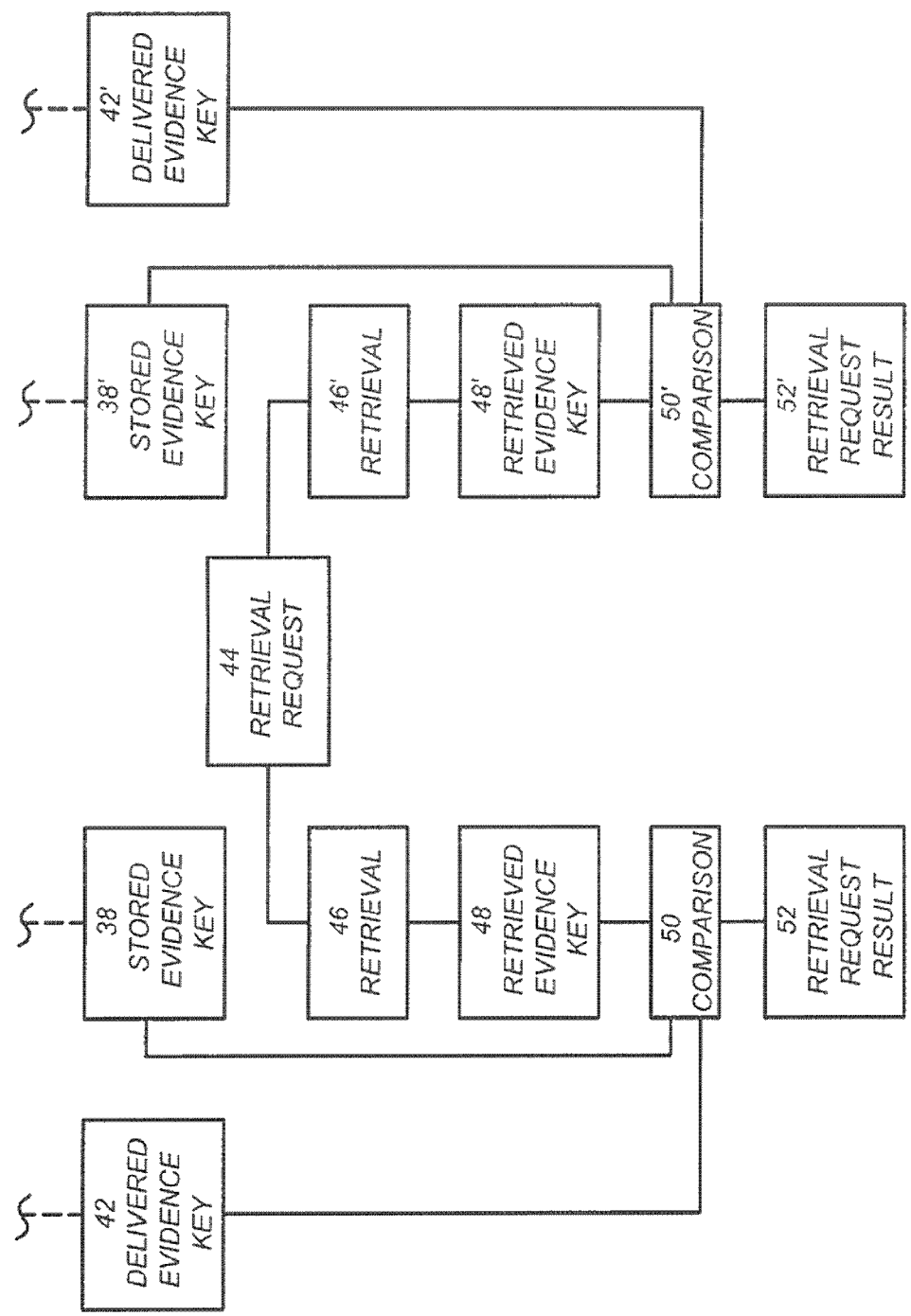
FIG. 2 shows a diagram of the embodiment of the invention including a retrieval request.

FIG. 2 shows a diagram of an embodiment of the invention herein, wherein the computer-implemented method herein includes a retrieval request, 44, that then initiates a retrieval step, 44, 44', etc. The retrieval step, 44, initiates a process whereby the system retrieves the evidence key, and/or any additional associated data to form a retrieved evidence key, 48, 48', etc. This retrieved evidence key, 48, may then be subject to a comparison step, 50, 50', etc. where the retrieved evidence key, 48, is compared with the stored evidence key, 38, and/or the delivered evidence key, 42. In an embodiment herein, the comparison step results in a retrieval request result, 52, 52', etc. In an embodiment herein, the comparison step, 50, compares the delivered evidence key, 42, (and any additional associated data (see FIG. 1 at 34)) with the retrieved evidence key, 48 (and any respective additional associated data). The comparison step, 50, may then highlight in the retrieval request result, 52, whether there were any discrepancies between the delivered evidence key, 42, and the retrieved evidence key, 48, or whether they match up.

Without intending to be limited by theory, it is believed that if the delivered evidence key, 42, and the retrieved evidence key, 48, match up, then they may serve as proof; or a rebuttable presumption of proof, that the digital document existed and/or was in the possession of a party at a certain point in time, such as when the evidence key request was submitted.

One skilled in the art understands that in FIG. 2, similar parallel processes for the retrieval step, 46', the stored evidence key, 38', are contemplated for embodiments of the invention herein. Without intending to be limited by theory it is believed that having such a parallel retrieval, 46', comparison, 50', etc. provides an added layer of security and assurance to the users that the method and system are sound and that the data integrity is intact. Conversely, if different results are retrieved from the parallel processes, then it may indicate that the data integrity has been compromised in some way. In an embodiment of the invention, when different results are retrieved, a log is generated, an entity, such as a system administrator, is notified, or a combination thereof.

Figure 3:
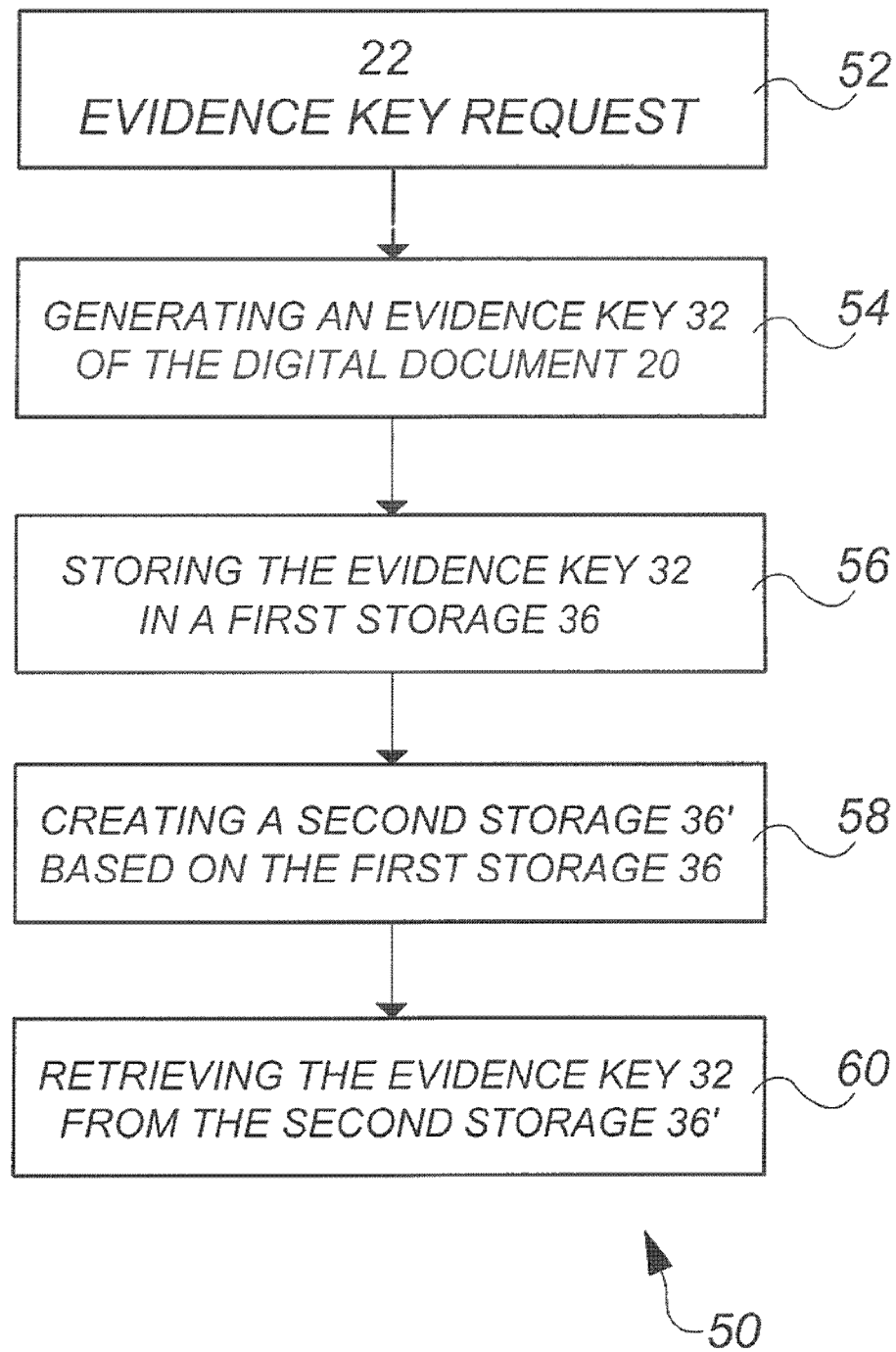
FIG. 3 shows a flow diagram of a method of evidencing the existence of a digital document according to one embodiment of the present invention.

FIG. 3 shows a flow diagram of a computer-implemented method of evidencing the existence of a digital document according to one embodiment of the present invention. Specifically, a flow diagram of a method, 50, of evidencing the existence of a digital document, 20, where in a first step, 52 of the method, 50, an evidence key request, 22, is received. As noted herein, the evidence key request is a request from a user to generate an evidence key for a digital document (see FIG. 1 at 20). An evidence key, 32, is then generated in step 54 by the evidence key generator (see FIG. 1 at 24). Once the evidence key, 32, is generated, it, along with any additional associated data (see FIG. 1 at 34) will be stored in a first storage, 36, as shown in step 56. In this embodiment, based on the first storage, (see FIG. 1 at 36), a second storage, 36', is created in step 58. Thus, the first storage, 36, and the second storage, 36', are in sequential arrangement, not in parallel as seen in FIG. 1. In an embodiment herein, the first storage, 36, and the second storage, 36', are located in different independent servers. During, for instance, disputes arising out of who created the file first or who copied whom, access may be granted to the user, the owner, and/or any relevant third parties to retrieve the evidence key, 32, and any additional associated data (see FIG. 1 at 34) from the second storage, 36'. The retrieval of the evidence key, 32, and any additional associated data (see FIG. 1 at 34), may be conducted by methods and algorithms known in the art, such as a search engine running on, for example, storage, 36, 36', etc.

Figure 4:
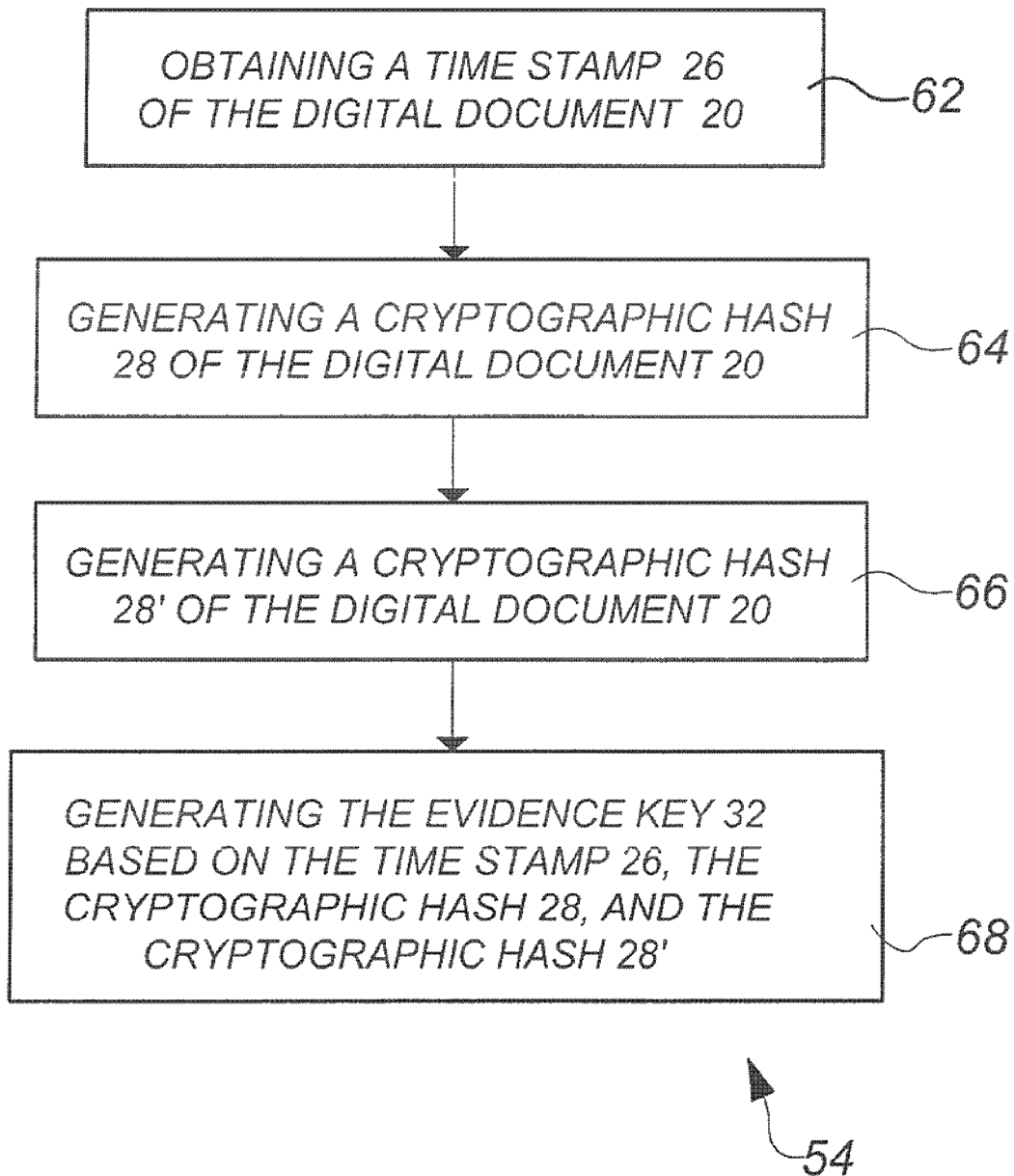
FIG. 4 shows a detailed flow diagram of step 54 of the method according to the embodiment as shown in FIG. 3.

FIG. 4 is a detailed flow diagram of step 54 of computer-implemented method 50 according to the embodiment as shown in FIG. 3. In step 62, a time stamp, 26, of the digital document, 20, is obtained. Afterwards, in step 64, a cryptographic hash, 28, is generated based on a cryptographic hash function. In a specific embodiment, the cryptographic hash function is an unkeyed cryptographic hash function selected from a group of SHA2-256, SHA2-512 and SHA3-256. In step 66, a cryptographic hash, 28', is generated based on a (second) cryptographic hash function that is different from the (first) cryptographic hash function that generated cryptographic hash, 28. In one embodiment of the present invention, the (second) cryptographic hash function is a hash function selected from a group consisting of SHA2-256, SHA2-512 and SHA3-256. In step 68, after obtaining the time stamp, 26, the cryptographic hash, 28, and cryptographic hash, 28', the evidence key, 32, is generated based on the time stamp, 26, the cryptographic hash, 28, and cryptographic hash, 28'.

Figure 5:
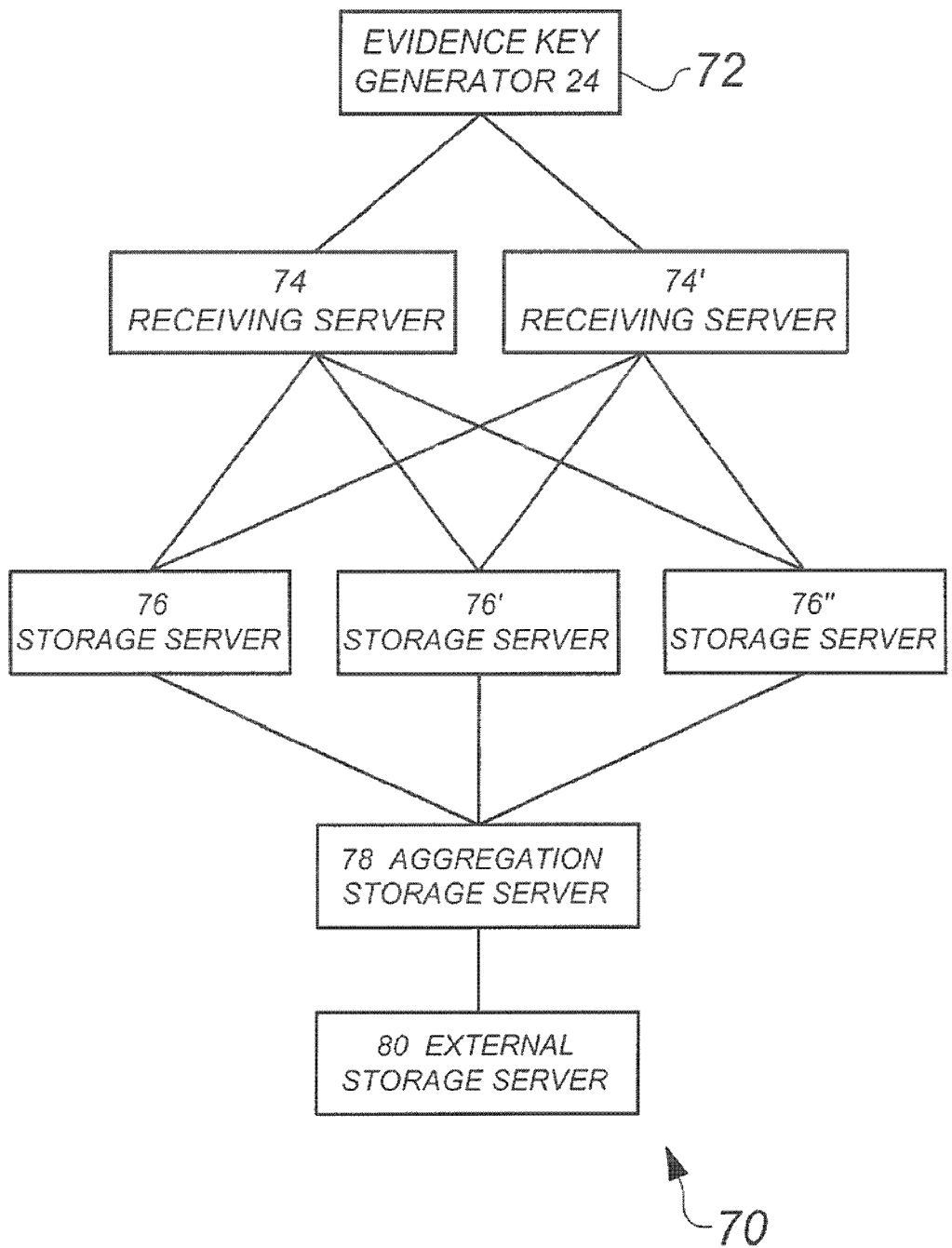
FIG. 5 shows an embodiment of a system of the present invention for evidencing the existence of a digital document.

FIG. 5 shows another embodiment of the present invention is directed to a computer system, 70, for evidencing the existence of a digital document, 20. The system, 70, includes an evidence key generator, 24, configured to generate an evidence key, 32, of a digital document, 20, according to, for example, the step 54 of method 50 in FIG. 3. The system, 70, further includes (first) receiving server, 74, and (second) receiving server, 74', configured to receive the evidence key (see FIG. 1 at 32) once it is generated by the evidence key generator, 24. Each receiving server, 74 and 74', is independently coupled with (first) storage server, 76, (second) storage server, 76', and (third) storage server, 76". Each of the storage servers, 76, 76', and 76", stores the evidence key (see FIG. 1 at 32) in its own database. Each of the storage servers, 76, 76', and 76", is independently coupled with an aggregation storage server, 78. After receiving database and server identification from each of the storage servers, 76, 76', and 76", the aggregation storage server, 78, is configured to create a second database based on a new time stamp and the received information from the storage servers, 76, 76', and 76".

In an embodiment of the present invention, the new time stamp is the time when the aggregation storage server, 78, receives a particular evidence key, 32. In one embodiment, the evidence key generator, 24, is configured to send an evidence key (see FIG. 1 at 32) to receiving server, 74, and receiving server, 74', immediately after the evidence key (see FIG. 1 at 32) is generated. In another embodiment, the storage servers, 76, 76', and 76", are configured to send their own respective databases to the aggregation storage server, 78, in batch mode.

The system, 70, further includes an external storage server, 80, which is a mirror of the aggregation storage server, 78. In an embodiment, the external storage server, 80, is not accessible to any user of the system, 70, and serves as a disaster recovery backup. In yet another embodiment, a search engine (not shown in FIG. 5) is coupled with the aggregation storage server, 78, and/or the external storage server, 80, thereby allowing the user or any relevant third parties to retrieve the evidence key, 32, and any additional associated data (see FIG. 1 at 34) of a particular digital document upon request.

According to an embodiment of the present invention, the database includes for each evidence key, the entries as shown in Table 1.

TABLE 1

Database Structure

| Entry | Remark |
| --- | --- |
| Cryptographic hash | at least 200 bits long |
| Time stamp | at least up to one-minute accuracy |
| Additional associated data: | |
| Digital File Size | no restriction in length |
| Digital File Name | NIL |
| User Identification | includes a user email address, |
| Storage Server Identification | NIL |
| Evidence Key Version | NIL |
| Remarks | NIL |

In Table 1, the evidence key is any combination of the time stamp(s), cryptographic hash(es) and/or the additional associated data.

In an embodiment herein, a second database includes the new time stamp and all the entries of the (first) database. In yet another embodiment, the system, 70, further includes a file property editor configured to obtain the digital file size and digital file name.

In another embodiment, the system, 70, further includes a biometric sensor configured to capture at least one biometric factor of the user for authentication purposes.

Figure 6:
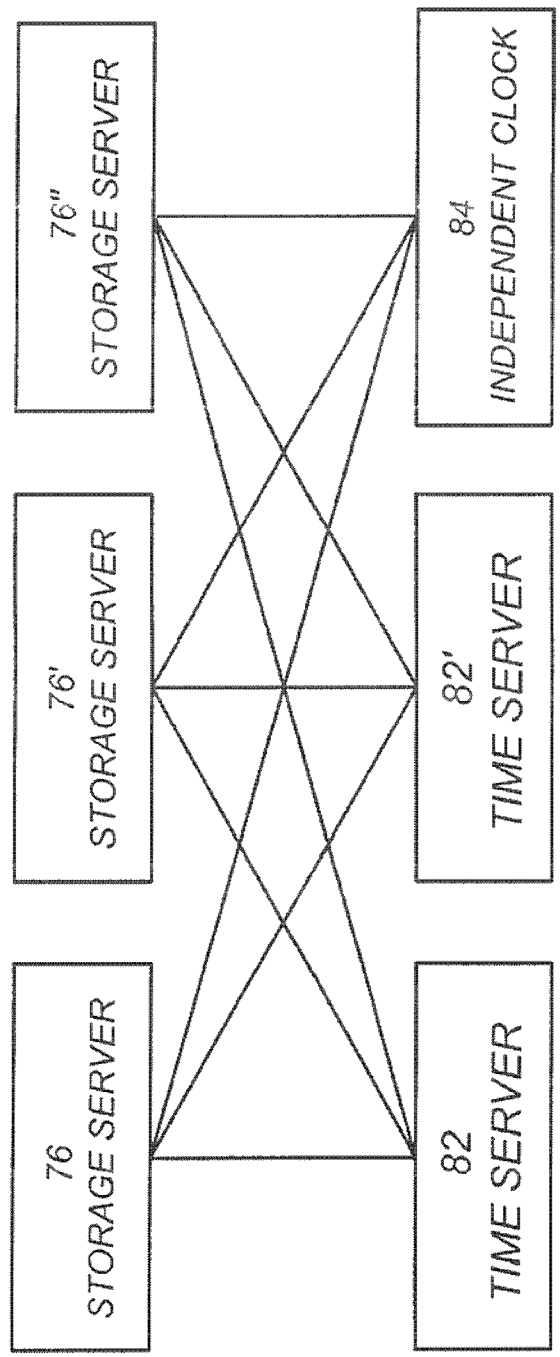
FIG. 6 shows an embodiment of the invention describing a method to synchronize the clocks of the storage servers.

FIG. 6 shows an embodiment of the invention describing a computer-implemented method to synchronize the clocks of the storage servers, 76, 76', 76", etc. Each of the storage servers, 76, 76', 76", are independently coupled with time server, 82, time server, 82', and an independent clock, 84. When the storage servers, 76, 76', 76", receives an evidence key (see FIG. 1 at 32) from the evidence key generator (see FIG. 1 at 24), it requests a time stamp from time server, 82, time server, 82', and independent clock, 84, respectively. The storage servers, 76, 76', 76", is further configured to assign into the database, as, for example, additional associated data, the earliest time stamp received from the time server, 82, the second time server, 82', and the independent clock, 84 as the acceptance time of that particular evidence key (see FIG. 1 at 32). In one embodiment, both time server, 82, and time server, 82', adopt Network Time Protocol whereas the independent clock, 84, is a GPS clock.

Figure 7:
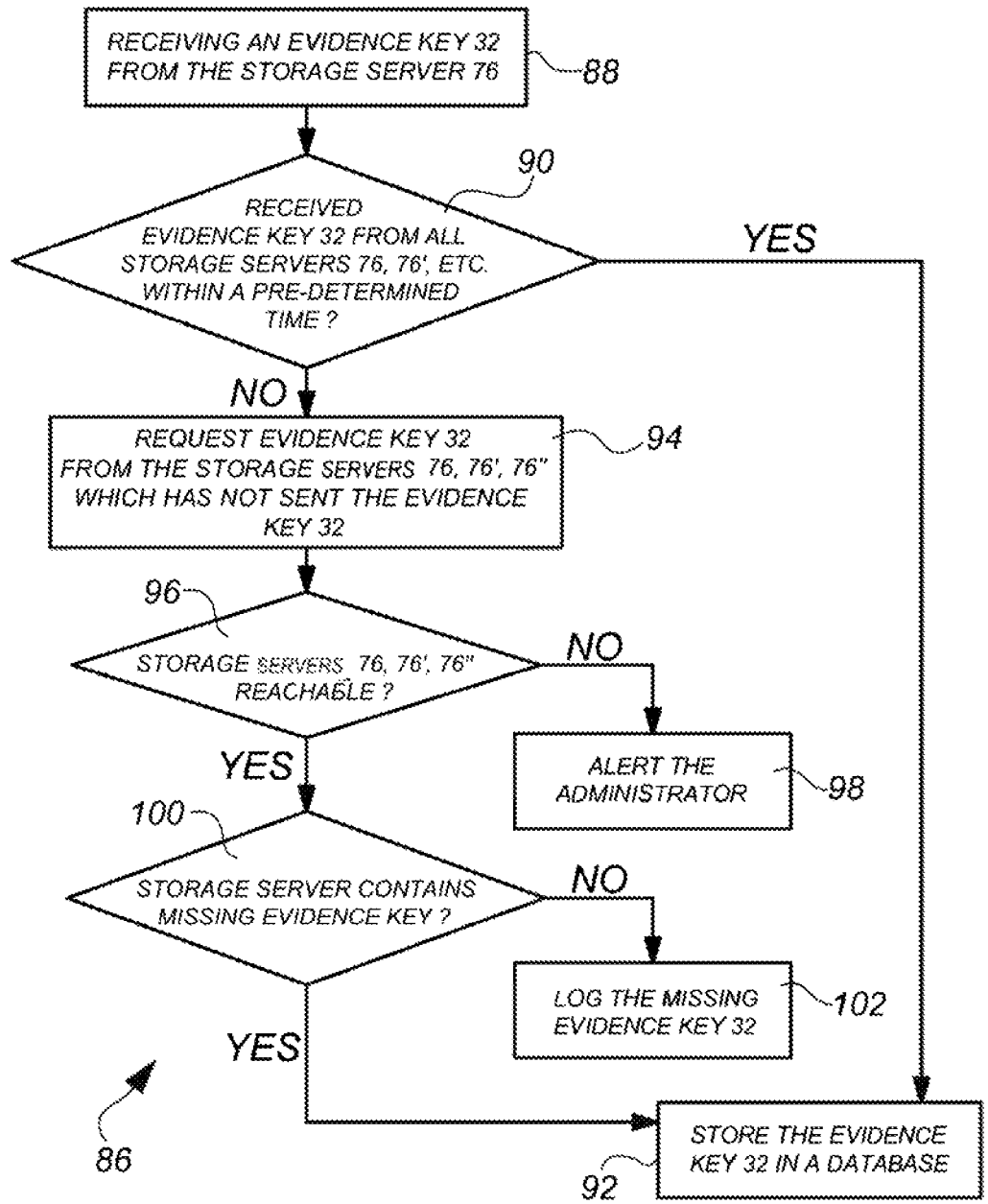
FIG. 7 shows an algorithm structure according to an embodiment of the present invention.

FIG. 7 shows an algorithm structure, 86, according to an embodiment of the present invention. The algorithm, 86, is implemented in the aggregation storage server (see FIG. 5 at 78) to ensure the data integrity. When the storage servers, 76, 76', 76", etc., send the evidence key(s) to the aggregation storage server (see FIG. 5 at 78) in step 88, the aggregation storage server (see FIG. 5 at 78) determines if it receives the corresponding evidence key from all storage servers, 76, 76', 76", etc. within a pre-determined time (condition 90). If the aggregation storage server (see FIG. 5 at 78) does receive the corresponding evidence key from all storage servers, 76, 76', 76", etc., within the pre-determined period of time, then the evidence key will be stored in the database located at the aggregation storage server (see FIG. 5 at 78) in step 92.

On the other hand, if the aggregation server (see FIG. 5 at 78) does not receive the corresponding evidence key from any one of the storage servers, 76, 76', 76", etc., within the pre-determined time, then in step 94 the aggregation storage server (see FIG. 5 at 78) will specifically request the missing evidence key from that particular storage server(s) whose corresponding evidence key is missing or late. In step 96, the aggregation storage server (see FIG. 5 at 78) checks to see whether that particular storage server, 76, is reachable. If the particular storage servers, 76, 76', or 76", etc., is not reachable, then in step 98, the aggregation storage server (see FIG. 5 at 78) alerts the administrator of the system (see FIG. 5 at 70). Alternatively, the aggregation storage server may note this in an error log, or otherwise note the discrepancy. However, if the storage servers, 76, 76', or 76", etc., is reachable, then that particular storage server, 76, will check if the missing evidence key, 32, exists in its own database and, if found (condition 100), then the particular storage server, 76, will send the missing evidence key, 32, to the aggregation storage server (see FIG. 5 at 78). The aggregation storage server (see FIG. 5 at 78) will then in step 92, aggregation storage server will store the evidence key, 32, in the aggregation storage server's database (step 92).

If the missing evidence key, 32, cannot be found in that particular storage server, 76, (condition 100), then in step 102, a log regarding the missing evidence key, 32 will be saved in, for example, an error log.

Figure 8:
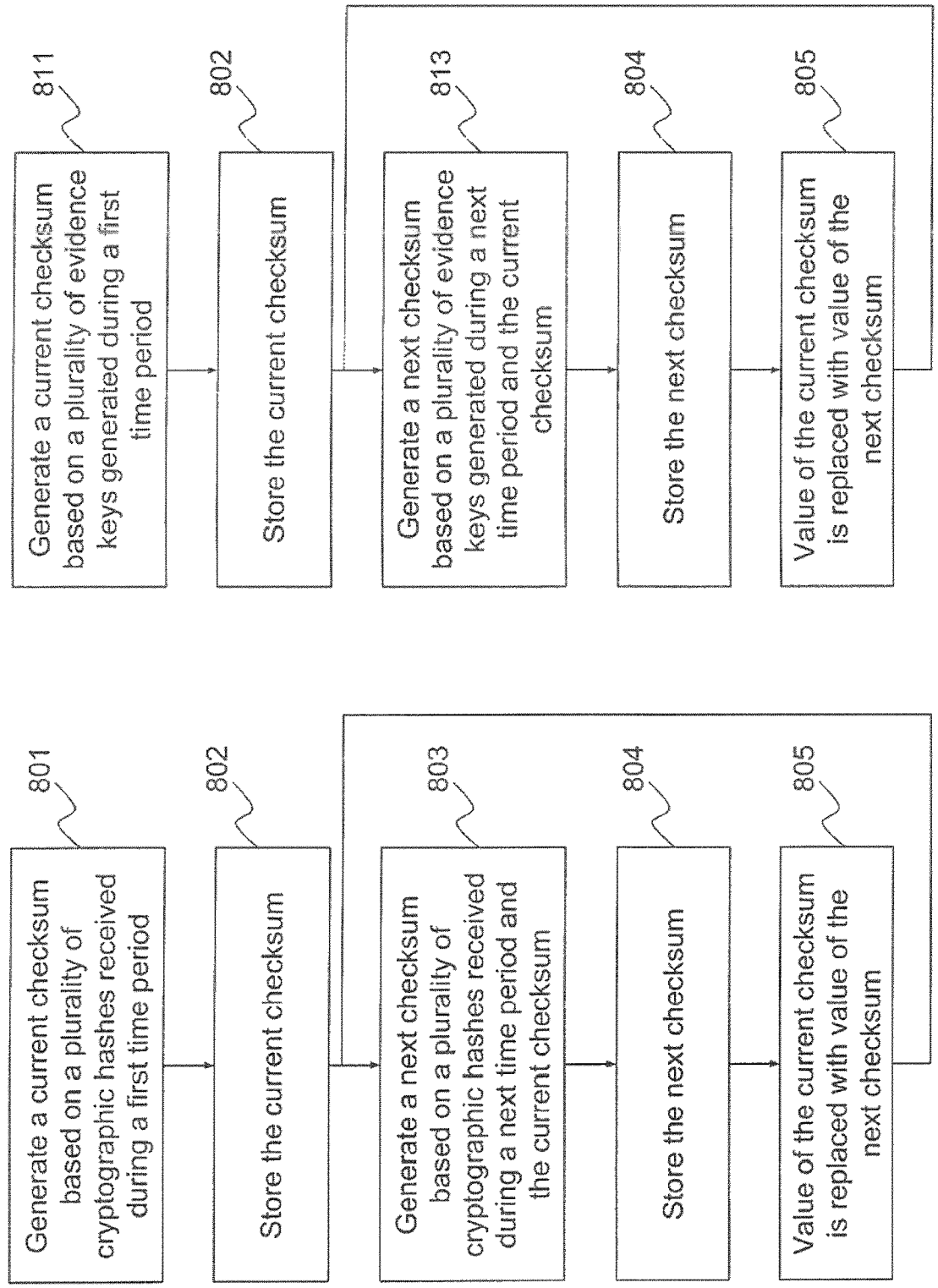
FIG. 8A shows an embodiment of the present invention generating a checksum.
FIG. 8B shows another embodiment of the present invention generating a checksum.

FIG. 8A shows an embodiment of a computer-implemented method of the present invention for generating a checksum. At step 801, a current checksum is generated based on a plurality of cryptographic hashes, or one cryptographic hash, received during a first time period. The first time period is in the range from about a few milliseconds to about a month. The shorter the first time period, the earlier the current checksum will be generated (i.e., a shorter time between generating checksums) and the greater the load that will be required on the computing resources as more checksums will be generated and stored. The longer the first time period, the later the current checksum will be generated (i.e., a longer time between generating checksums) and the lower the load will be on the computing resources as fewer checksums will be generated and stored. The checksums are used to ensure integrity of the plurality of cryptographic hashes stored. For example, in order to detect if one or more of the cryptographic hashes stored, for example in a database, are changed or tampered with, the cryptographic hashes are used to create a second checksum. If the original checksum does not match the second checksum, then this indicates at least one of cryptographic hashes stored in the database have been changed or tampered.

One skilled in the art understands that there are myriad ways to generate the checksums. For example, the checksum can be generated using, for example, a cryptographic hash algorithm, a block parity function, a cyclic redundancy check (CRC), and a combination thereof. It is preferred to use a cryptographic hash function such as SHA2 and/or SHA3 to generate the checksum so that the probability of a hash collision is comparatively low.

In one example, the first time period is one minute.

For illustration purposes only, there may be, for example, one hundred cryptographic hashes received during the first time period. A string is first generated by concatenating the one hundred cryptographic hashes in the chronological order in which they are received. The current checksum is then generated by, for example, applying a SHA2-256 hash function on the string. In one example, the string is in hexadecimal format. In another the string is in base64 format.

At step 802, the current checksum is stored in a storage media, as discussed herein. The checksum is typically stored in a non-volatile storage media (i.e., a non-volatile computer readable storage media) and maintained preferably for a period of time, for example, many years, or even indefinitely. As the plurality of cryptographic hashes and corresponding evidence keys may be used as court evidence years later, the checksums should also be stored for years, or indefinitely, in order to further prove that none of the plurality of cryptographic hashes and corresponding evidence keys has been changed or tempered.

At step 803, a next checksum is generated based on another plurality of cryptographic hashes received during a next time period and the current hash. In one embodiment herein, the next time period is one minute and began upon the end of the first time period.

For illustration purposes only, there may be, for example, thirty cryptographic hashes received during the next time period. A string is first generated by concatenating the thirty hundred cryptographic hashes in the chronological order in which they were received and the current checksum. The next checksum is generated by, for example, applying a SHA2-256 hash function on the string.

At step 804, the next checksum is stored as in the same manner as the current checksum stored in step 802. At step 805, the value of the current checksum is updated and replaced with value of the next checksum. The updated current checksum is then used for generating another next checksum in a future next time period. In an embodiment herein, step 805 is performed before step 804 and the current checksum is stored in step 804 instead.

As the next checksum is generated partially based on the current checksum and the current checksum is also generated partially based on past checksums, then the next checksum is also generated partially based on past checksums. Even in the case where one or more of past checksums are lost or not stored, in an embodiment herein it is believed that the current checksum can still be regenerated using all the received plurality of cryptographic hashes. One skilled in the art understands that by comparing the regenerated checksums and stored past checksums, the integrity of the plurality of cryptographic hashes stored can then be verified.

In an embodiment of the invention, at steps 801 and 803, instead of generating a current checksum and a next checksum on a time basis, the generation is based on a predetermined number of cryptographic hashes received. For example, a checksum is generated for every three hundred cryptographic hashes received.

FIG. 8B shows an embodiment of a computer-implemented method of the present invention for generating a checksum. The steps in FIG. 8B are similar to the steps in FIG. 8A. Steps 801 and 803 are replaced by steps 811 and 813 respectively. Compared to steps 801, a current checksum is generated based on a plurality of evidence keys generated during a first time period at step 811, instead of based on a plurality of cryptographic hashes as in FIG. 8A. Similarly, a next checksum is generated based on a plurality of evidence keys generated during a next time period at step 813. As evidence keys are based on a time stamp and a plurality of cryptographic hashes, or a single cryptographic hash, a checksum can further be used to verify that the time stamp, the plurality of cryptographic hashes and/or the additional associated data stored in evidence key have not been changed and/or tampered with.

Figure 9:
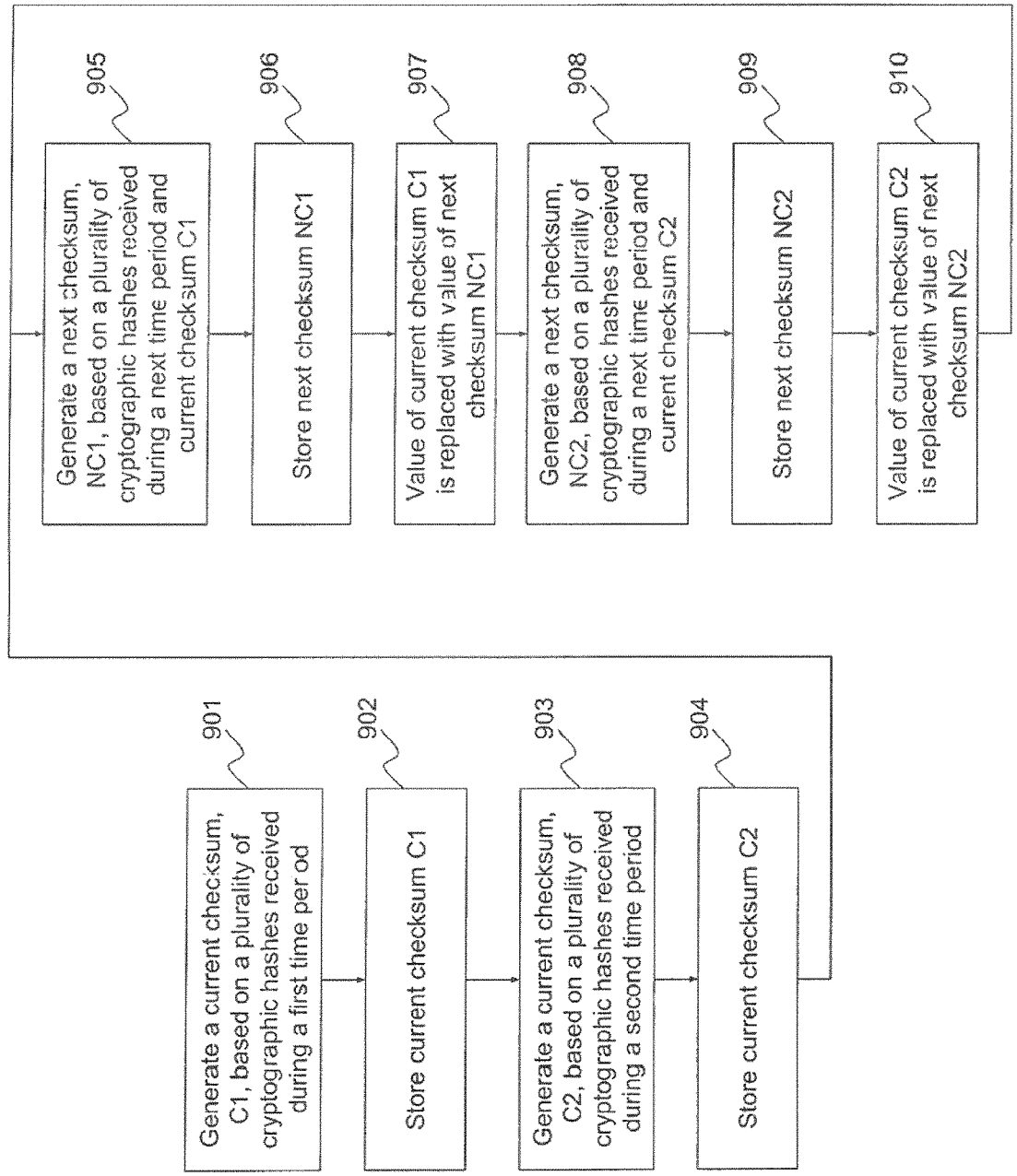
FIG. 9 shows another embodiment of the present invention generating a checksum.

FIG. 9 shows another embodiment of a computer-implemented method of the present invention for generating a checksum. A plurality of current checksums, for example C1 and C2, are used to generate next checksums NC1 and NC2 respectively. At step 901, current checksum C1, is generated based on a plurality of cryptographic hashes, or one cryptographic hash, received during a first time period. At step 902, current checksum C1 is stored in a storage media. At step 903, another current checksum, C2, is generated based on a plurality of cryptographic hashes, or one cryptographic hash, received during a second time period. At step 904, the current checksum C2 is stored as in the same manner as the current checksum stored in step 902.

The generation of current checksum C2 is not based on current checksum C1 and the plurality of cryptographic hashes, or one cryptographic hash, received during the first time period. Therefore while current checksum C1 is being computed at 901 and being stored at step 902, current checksum C2 is independently generated without using any information of current checksum C1, such as the plurality of cryptographic hashes, or one cryptographic hash, received during the first time period. As current checksum C1 is being processed in a processing unit of the system, such as central processing unit, the cryptographic hashes may have already arrived during the second time period, and so on.

In an embodiment herein, by the time current checksum C1 is generated, the second time period may have ended and a third time period may have already been started. In order to allow more time to calculate the current checksums, a plurality of current checksums are used. Accordingly one skilled in the art understands that there is no actual limit that only two current checksums, C1 and C2, can be used, but this embodiment is described as such merely for ease of understanding. More current checksums, for example, about 5 current checksums; or about 7 current checksums; or about 10 current checksums; or about 25 current checksums; or about 50 current checksums; or about 100 current checksums, can be used to further lengthen the time allowed to calculate current checksums.

At step 905, a next checksum NC1, is generated based on another plurality of cryptographic hashes received during a next time period and current checksum C1. Next checksum NC1 is generated without using information of current checksum C2, the plurality of cryptographic hashes, or one cryptographic hash, received during the second time period. Therefore, the computing/processing unit of the system has more time to generate current checksum C2.

At step 906, the next checksum NC1 is stored as in the same manner as the current checksum is stored in step 902.

At step 907, the value of the current checksum C1 is updated and replaced with the value of the next checksum NC1.

At step 908, a next checksum NC2, is generated based on another plurality of cryptographic hashes received during a next time period and current checksum C2. Next checksum NC2 is generated without using any information from the current checksum NC1, such as the plurality of cryptographic hashes, or one cryptographic hash, received during the time period of step 905-906. Therefore, processing unit of the system has more time to generate current checksum NC1.

At step 909, another next checksum NC2 is stored in the same manner as the current checksum was stored in steps 902 and 904. At step 910, the value of the current checksum C2 is updated and replaced with value of the next checksum NC2.

When more time is required for generating the next checksum, then steps 905-910 can be further extended, for example, to have next checksums NC3, NC4, NC5, etc.

In an embodiment herein, the methods herein, such as, for example described in FIGS. 8A, 8B, and 9, the iterative checksum generation and replacement steps essentially outline the steps of a blockchain which functions to authenticate the integrity of the database formed thereby.

In an embodiment herein, the current checksum 802 is an initial coin offering (ICO); or the ICO is a cryptocurrency; or the cryptocurrency is Bitcoin, Litecoin, Namecoin, SwiftCoin, bytecoin, peercoin, dogecoin, Emercoin, Feathercoin, Gridcoin, Primecoin, Ripple, Next, Auroracoin, Dash, NEO, MazaCoin, Monero, NEM, PotCoin, Synereo AMP, Titcoin, Verge, Stellar, Vercoin, Ethereum, Ethereum Classic, Tether, Decred, Waves platform, Zcash, BitConnect, Bitcoin Cash, EOS IO, Cardano, Petro, Petro Gold, etc. The generation of a next checksum 804 and replacement of the current checksum 802 with the next checksum 804 is essentially treated as a transaction and is recorded in the database. The database in turn may be stored on, for example, a storage server (e.g., see FIG. 5 at 76, 778, 80, etc.) or a ledger stored on a server or computer system.

In an embodiment herein of FIG. 9 herein, the first time period, the second time period, etc. are alternating predetermined periods of time, and/or are arranged to a mutually-exclusive, alternating schedule.

The method herein may be implemented by a computer. Furthermore, the system herein may be a computer system.

Figure 10:
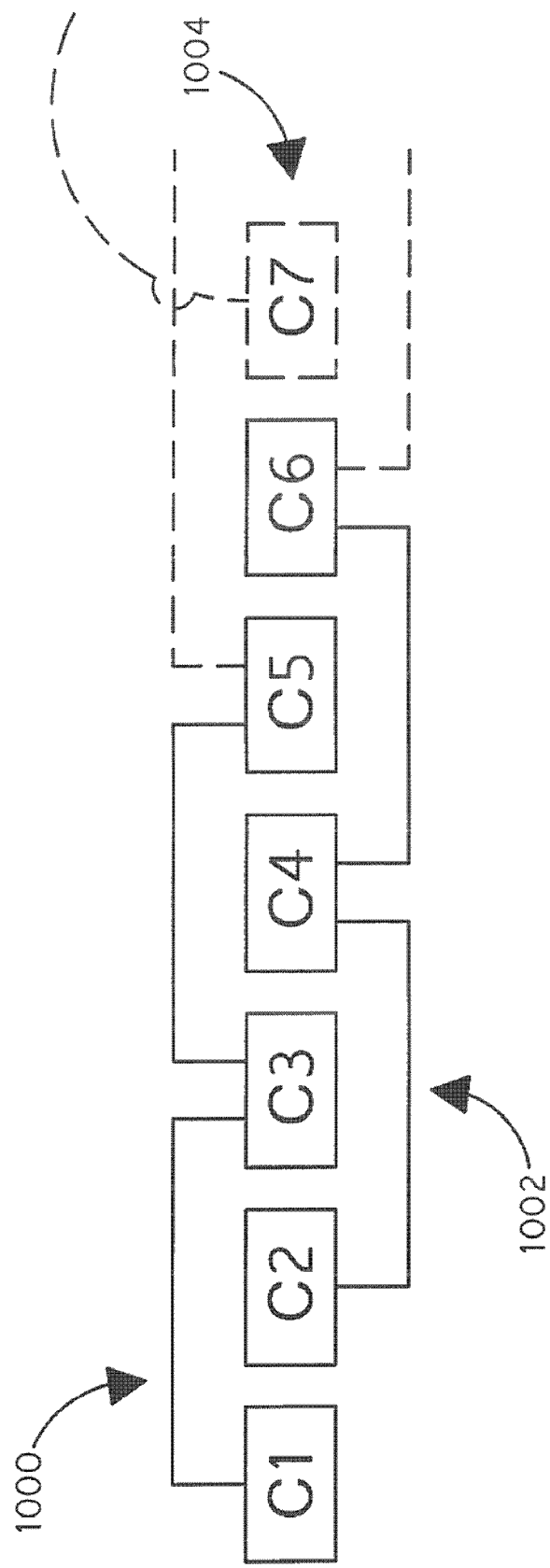
FIG. 10 shows a schematic diagram of a tag chain embodiment of the present invention. The figures herein are for illustrative purposes only and do not necessarily show all necessary or optional steps, components, and/or other details.

FIG. 10 shows a schematic diagram of a tag (block) chain embodiment of the invention herein. In FIG. 10, a computer-implemented first blockchain 1000 is initiated when a first link C1 is generated; typically a checksum generated via a cryptographic hash. The link herein may be a single checksum, or a plurality of checksums. The link herein may be and/or represent, for example, a single transaction, a plurality of transactions, a transfer, a plurality of transfers, a period of time, a device (e.g., an electronic device) or a plurality of devices, etc., and a combination thereof; or, for example, a plurality of transactions that occur during a period of time. A second blockchain 1002 is initiated when a link C2 is generated; typically a checksum generated via a cryptographic hash. Assuming for this embodiment that each link is a single checksum, then in contrast to the typical blockchain, in the embodied tag chain, checksum C1 does not link to checksum C2 to form the next link in the chain. Instead, checksum C1 links to checksum C3 and then to checksum C5, etc. Similarly checksum C2 links to checksum C4 and then to checksum C6, etc. In the embodiment of FIG. 10, a third blockchain 1004 whose first block is checksum C7, is added to the tag chain system after the first blockchain 1000 and the second blockchain 1002 have already been established. In an embodiment herein, a plurality of blockchains are added to the tag chain system after a plurality of blockchains already exist within the tag chain system.

In the schematic representation of FIG. 10, each checksum indicates a single link in a chain, 1000, 1002, 1004, etc. Thus, all of the odd checksums from C1 to C6 form chain 1000, and all of the even checksums from C1 to C6 form a separate, mutually-exclusive chain 1002. Accordingly, this embodiment is described as a "tag chain" type of blockchain. In essence, one chain (or all the other chains) is "tagged out" while one chain is "tagged in" meaning it is active and therefore eligible to be connected to a new link in the chain, or otherwise receiving a new link in the chain. However, these chains are mutually-exclusive and thus only a single chain can be "tagged in" at any given point. These chains (and possibly including other chains as well, alternate between being active (i.e., receiving a new link) and inactive (waiting to receive a new link). In FIG. 10, checksum C7 represents the first link in (and the initiation of) new chain 1004.

In an embodiment herein, only a single chain is active at any given time.

Thus, the tag chain system contains at least a first chain and a second chain which are mutually-exclusive. In an embodiment herein, each chain is mutually-exclusive. However, in an embodiment herein the first chain and the second chain (and any other chains) are intertwined within the same blockchain system. In an embodiment herein, the checksums alternate between different chains, and one skilled in the art can understand that various patterns are possible, such as, but not exclusively, as defined herein. In such an embodiment, the chains may be mutually exclusive meaning that they do not contain any common links therebetween.

In an embodiment herein, the checksums are not linked into odd and even checksums, but could also be linked in a different pattern; or in a plurality of separate chains. In an embodiment herein, the chains are separated using sequence logic, for example, 1, 3, 5, 7, etc. which may be embedded within the checksum. In an embodiment herein, the separation of the various links into different chains via a period of time, a number of checksums, a portion of a checksum, a modification to each checksum, a modulo method, a device or a plurality of devices, an address, a unique identifier, and a combination thereof; or a predetermined period of time, a predetermined number of checksums, a predefined portion of a checksum (or each checksum), a prefix modification to each checksum, a suffix modification to each checksum, a modulo method, a device or a plurality of devices, an address, a unique identifier, and a combination thereof.

For example, if the predetermined period of time is 1 hour, then every hour represents a separate link (e.g., C1 in FIG. 10) in a chain. Upon reaching the expiration of one hour, then the next link (e.g., C2 in FIG. 10) is initiated, and may be assigned to a different chain or the same chain, as desired. In another example, if the number of checksums (in each link) is 1000; or the predetermined number of checksums is 1000, then for every 1000 checksums, a different link is created. Typically there may be a pool of links or checksums which are arranged/assigned to chains in a first-in-first-out (FIFO) order. In yet another example, the selection of the chain for each link (or checksum) may use a modulo method (see https://en.wikipedia.org/wiki/Modulo operation) to divide the link (or checksum) by a number and use the remainder to choose which chain to assign the link. In another example, a portion of the checksum, for example, 3 alphanumeric digits (a prefix, a suffix, or in the middle) are used to assign the checksum to the appropriate chain. In such an embodiment, for example, if a checksum is "12313393990A381F10" and the link is determined by a suffix, then the system will recognize the "F10" as a suffix and will assign this link to the "F10" chain. This is a common technique for "random"+round robin (chain) selection.

In an embodiment herein, a modification to each checksum is used, for example, 3 or more alphanumeric digits (a prefix, a suffix, or in the middle) are added to each link and are used to assign the link to the appropriate chain. In such an embodiment, for example, if a link (or a checksum) is "12313393990A381F10", then the system may add the alphanumeric digits "E35" to the beginning, middle or end of this link and then assign this link to the "E35" chain.

In an embodiment herein, the checksums, links and/or the chains may be divided up according to different devices, and/or by identifying different addresses; or IP addresses, machine addresses, email identifiers, account identifiers, etc. In an embodiment herein, each device is assumed to possess a different address.

In an embodiment herein, the first chain and the second chain are stored on the same server. Without intending to be limited by theory, it is believed that this may be desirable from a system architecture-point of view as it may make it easier to manage the tag chain system. In an embodiment herein, the first chain and the second chain are stored on different servers. Without intending to be limited by theory, it is believed that this may be desirable from a system architecture-point of view as it may make the tag chain system more secure.

In an embodiment herein, additional chains may be added when determined by an administrator, or when the tag chain system recognizes that the current time, energy requirements, etc. for generating the next link in the chain are too much; or greater than or equal to a predetermined value. Alternatively, the tag chain system may add one or more additional chains upon reaching a predetermined criteria, such as a predetermined number of links in the existing chain and/or most recent chain, a predetermined period of time, etc.

For example, the different links (and therefore the chains) may be separated by a specific period of time, or a group of checksums, a group of transactions, etc. In an embodiment herein, each link in the chain contains from about 1 transaction to about 1,000,000 transactions; or from about 1 to about 10,000 transactions; or from about 1 to about 1,000 transactions; or from about 2 transactions to about 10,000 transactions; or from about 100 transactions to about 1,000 transactions. In an embodiment herein, the link for each chain is defined by a time interval wherein all transactions and/or checksums that occur within the time interval either form a link (for the appropriate chain) and/or may be aggregated into a single link (for the appropriate chain). In an embodiment herein, the time interval is from about 1 millisecond to about 1 month; or from about 1 second to about 1 week; or from about 1 minute to about 1 day, as measured by the computer-implemented tag chain's system and/or server(s). Alternatively, the time interval could be measured by, for example, an internal computer clock, process, or that of an external server.

Without intending to be limited by theory, it is believed that the tag chain herein may provide significant advantages over a single integrated blockchain. For example, it is believed that as a blockchain becomes longer and longer, the checksum timing (e.g., the time it takes to generate a cryptographic hash) also increases in time, requires more energy, and/or requires more computing time. By employing the tag chain and therefore multiple actual chains within a single blockchain system, it is believed that the overall speed of the blockchain system may be accelerated, and/or may further possess additional benefits, such as lower energy consumption, lower computation time, etc. because, for example, the length of each of the individual chains grows more slowly.

In an embodiment herein, the different chains in a tag chain system are implemented in and/or stored on a common server or common servers. In an embodiment herein, each of the different chains in a tag chain system are implemented and/or stored on a different server or different servers. In an embodiment herein, each of the different chains in a tag chain system are implemented and/or stored on a plurality of servers.

In an embodiment herein, the aggregation storage server creates a duplicate database of the evidence key and any additional associated data.

In yet another embodiment, the evidence key may also contain a time-dependent key, which is independent from the content or any properties of the digital document generated by the system.

It is understood by those skilled in the art that, for example, the number of time stamps, cryptographic hashes, cryptographic hash functions, evidence key generators, associated data, storage, receiving servers, storage servers, aggregation storage servers, etc., are not limited by the description herein. It is understood that the actual number can be adjusted based on the actual implementation of the invention. Moreover, additional algorithms could be implemented at different levels of the system to improve the reliability and integrity of the system. In an embodiment, when a duplicate evidence key is detected in any of the databases, a warning notice will be provided to the system administrator and the earliest creator of such an evidence key.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. As a result, such features are inherently rooted in computer technology and solve problems which are inherently related to computer technology. For example, embodiments of the present invention may generate cryptographic hashes (such as the cryptographic hash 28 and the cryptographic hash 28') on amounts of data and within amounts of time that would be impossible or infeasible to perform manually. For example, embodiments of the present invention may generate a cryptographic hash on a megabyte of data in less than one second, which would be impossible for a human to perform manually. As another example, embodiments of the present invention may deliver data (e.g., via delivery 40 or delivery 40') over the Internet and/or other electronic communications network, which inherently requires the use of telecommunications equipment and which cannot be performed manually by a human.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

Non-limiting embodiments of the present invention include:

1. A computer-implemented method for evidencing the existence of a digital document comprising the steps of:
    A. obtaining a time stamp of the digital document;
    B. obtaining a plurality of cryptographic hashes of the digital document;
    C. generating an evidence key based on the time stamp and the plurality of cryptographic hashes; and
    D. storing the evidence key to provide a stored evidence key.
2. The method according to embodiment 1, further comprising the step of:
    E. retrieving the evidence key to provide a retrieved evidence key.
3. The method according to embodiment 2, further comprising the step of:
    F. comparing the stored evidence key to the retrieved evidence key.
4. The method according to embodiment 2, wherein the retrieval of the evidence key is enabled by providing an identifier; or wherein the identifier is selected from the group consisting of a cryptographic hash, additional associated data, and a combination thereof.
5. The method according to any one of embodiments 1-4, wherein the time stamp is a plurality of time stamps.
6. The method according to any one of embodiments 1-5, wherein the plurality of cryptographic hashes is from about 2 to about 100 cryptographic hashes; or from about 2 to about 25 cryptographic hashes; or from about 3 to about 10 cryptographic hashes; or from about 4 to about 8 cryptographic hashes.
7. The method according to any one of embodiments 1-6, wherein each of the plurality of cryptographic hashes is generated by a different cryptographic hash function.
8. The method according to any one of embodiments 1-7, wherein at least one of the cryptographic hashes is generated by an unkeyed cryptographic has function; or an unkeyed cryptographic hash function selected from the group consisting of BLAKE-256, BLAKE-512, BLAKE2b, BLAKE2s, ECOH, GOST, Grøstl, HAS-160, HAVAL, JH, MD2, MD4, MD5, MD6, Radio-Gatún, RIPEMD, RIPEMD-128, RIPEMD-160, RIPEMD-320, SHA-1, SHA-224, SHA-256, SHA-384, SHA-512, SHA-3, Skein, Snefru, Spectral Hash, Streebog, SWIFFT, Tiger, Whirlpool, and a combination thereof; or an unkeyed cryptographic hash function selected from the group consisting of SHA-1, SHA-224, SHA-256, SHA-384, SHA-512, SHA-3, and a combination thereof; or an unkeyed cryptographic hash function selected from the group consisting of SHA2-256, SHA2-512, SHA3-256, SHA-3, and a combination thereof.

9. The method according to any one of embodiments 1-8, wherein the time stamp comprises a plurality of time stamps; or from about 2 to about 10 time stamps; or from about 2 to about 8 times tamps; or from about 3 to about 6 time stamps.

10. The method according to any one of embodiments 1-9, wherein the storing of the evidence key occurs on a storage media selected from the group consisting of a server, a storage drive, paper, a CD-ROM, a DVD, a single-use storage media, and a combination thereof, or a server, a storage drive, a CD-ROM, a DVD, a single-use storage media, and a combination thereof, or a server, a storage drive, a CD-ROM, a DVD, and a combination thereof; or a disk drive, a flash memory, a magnetic tape, and a combination thereof; or a hard disk, a floppy disk, a magneto-optical disk, a flash memory, a magnetic tape, and a combination thereof; or a hard disk, a flash memory, and a combination thereof.

11. A computer-implemented method for evidencing the existence of a digital document comprising the steps of:
    A. obtaining a plurality of time stamps of the digital document;
    B. obtaining a cryptographic hash of the digital document;
    C. generating an evidence key based on the plurality of time stamps and the cryptographic hash; and
    D. storing the evidence key to provide a stored evidence key.

12. The method according to embodiment 11, further comprising the step of:
    E. retrieving the evidence key to provide a retrieved evidence key.

13. The method according to embodiment 12, further comprising the step of:
    F. comparing the stored evidence key to the retrieved evidence key.

14. The method according to embodiment 12, wherein the retrieval of the evidence key is enabled by providing an identifier; or wherein the identifier is selected from the group consisting of a cryptographic hash, additional associated data, and a combination thereof.

15. The method according to any one of embodiments 11-14, wherein the plurality of time stamps is from about 2 to about 10 time stamps; or from about 2 to about 8 times tamps; or from about 3 to about 6 time stamps.

16. The method according to any one of embodiments 11-15, wherein each of the plurality of time stamps is generated by a different time source selected from the group consisting of a time server, an independent clock, and a combination thereof or a time server, an independent clock, and a combination thereof or a Global Positioning System (GPS) clock.

17. The method according to any one of embodiments 11-16, wherein the cryptographic hash is a plurality of cryptographic hashes; or wherein the cryptographic hash is from about 2 to about 100 cryptographic hashes; or from about 2 to about 25 cryptographic hashes; or from about 3 to about 10 cryptographic hashes; or from about 4 to about 8 cryptographic hashes.

18. The method according to embodiment 17, wherein each of the plurality of cryptographic hashes is generated by a different cryptographic hash function.

19. The method according to any one of embodiments 11-18, wherein the cryptographic hash is generated by an unkeyed cryptographic has function; or an unkeyed cryptographic hash function selected from the group consisting of BLAKE-256, BLAKE-512, BLAKE2b, BLAKE2s, ECOH, GOST, Grøstl, HAS-160, HAVAL, JH, MD2, MD4, MD5, MD6, RadioGatún, RIPEMD, RIPEMD-128, RIPEMD-160, RIPEMD-320, SHA-1, SHA-224, SHA-256, SHA-384, SHA-512, SHA-3, Skein, Snefru, Spectral Hash, Streebog, SWIFFT, Tiger, Whirlpool, and a combination thereof or an unkeyed cryptographic hash function selected from the group consisting of SHA-1, SHA-224, SHA-256, SHA-384, SHA-512, SHA-3, and a combination thereof or an unkeyed cryptographic hash function selected from the group consisting of SHA2-256, SHA2-512, SHA3-256, SHA-3, and a combination thereof.

20. The method according to any one of embodiments 11-19, wherein the storing of the evidence key occurs on a storage media selected from the group consisting of a server, a storage drive, paper, a CD-ROM, a DVD, a single-use storage media, and a combination thereof, or a server, a storage drive, a CD-ROM, a DVD, a single-use storage media, and a combination thereof, or a server, a storage drive, a CD-ROM, a DVD, and a combination thereof; or a disk drive, a flash memory, a magnetic tape, and a combination thereof; or a hard disk, a floppy disk, a magneto-optical disk, a flash memory, a magnetic tape, and a combination thereof; or a hard disk, a flash memory, and a combination thereof.

21. A computer-implemented method for evidencing the existence of a digital document comprising the steps of:
    A. obtaining a time stamp of the digital document;
    B. obtaining a cryptographic hash of the digital document;
    C. generating an evidence key based on the time stamp and the cryptographic hash; and
    D. storing the evidence key to provide a stored evidence key, wherein the storing of the evidence key is stored on a plurality of storage media.

22. The method according to embodiment 21, further comprising the step of:
    E. retrieving the evidence key to provide a retrieved evidence key.

23. The method according to embodiment 22, further comprising the step of:
    F. comparing the stored evidence key to the retrieved evidence key.

24. The method according to embodiment 22, wherein the retrieval of the evidence key is enabled by providing an identifier; or wherein the identifier is selected from the group consisting of a cryptographic hash, additional associated data, and a combination thereof.

25. The method according to any one of embodiments 21-24, wherein the each of the plurality of storage media is selected from the group consisting of a server, a storage drive, paper, a CD-ROM, a DVD, a single-use storage media, and a combination thereof, or a server, a storage drive, a CD-ROM, a DVD, a single-use storage media, and a combination thereof; or a server, a storage drive, a CD-ROM, a DVD, and a combination thereof, or a disk drive, a flash memory, a magnetic tape, and a combination thereof; or a hard disk, a floppy disk, a magneto-optical disk, a flash memory, a magnetic tape, and a combination thereof, or a hard disk, a flash memory, and a combination thereof.

26. The method according to any one of embodiments 21-25 wherein the plurality of storage media are located in a plurality of physical locations; or a plurality of different physical locations; or from about 2 to about 20 different physical locations; or from about 2 to about 15 different physical locations; or from about 3 to about 10 different physical locations.

27. The method according to any one of embodiments 21-26, wherein the time stamp comprises a plurality of time stamps; or from about 2 to about 10 time stamps; or from about 2 to about 8 times tamps; or from about 3 to about 6 time stamps.

28. The method according to any one of embodiments 21-27, wherein the wherein the cryptographic hash is a plurality of cryptographic hashes; or wherein the cryptographic hash is from about 2 to about 100 cryptographic hashes; or from about 2 to about 25 cryptographic hashes; or from about 3 to about 10 cryptographic hashes; or from about 4 to about 8 cryptographic hashes.

29. The method according to any one of embodiments 21-28, wherein the cryptographic hashes are generated by an unkeyed cryptographic has function; or an unkeyed cryptographic hash function selected from the group consisting of BLAKE-256, BLAKE-512, BLAKE2b, BLAKE2s, ECOH, GOST, Grøstl, HAS-160, HAVAL, JH, MD2, MD4, MD5, MD6, RadioGatún, RIPEMD, RIPEMD-128, RIPEMD-160, RIPEMD-320, SHA-1, SHA-224, SHA-256, SHA-384, SHA-512, SHA-3, Skein, Snefru, Spectral Hash, Streebog, SWIFFT, Tiger, Whirlpool, and a combination thereof or an unkeyed cryptographic hash function selected from the group consisting of SHA-1, SHA-224, SHA-256, SHA-384, SHA-512, SHA-3, and a combination thereof or an unkeyed cryptographic hash function selected from the group consisting of SHA2-256, SHA2-512, SHA3-256, SHA-3, and a combination thereof.

30. A computer-implemented method for evidencing the existence of a plurality of digital documents containing the steps of:
   A. receiving a plurality of cryptographic hashes during a first time period;
   B. generating a current checksum based on the plurality of cryptographic hashes received during the first time period;
   C. storing the current checksum in a storage media;
   D. receiving a plurality of cryptographic hashes during a second time period;
   E. generating a next checksum based on the plurality of cryptographic hashes received during the second time period;
   F. storing the next checksum in the storage media; and
   G. replacing the checksum in the storage media with the next checksum.

31. The method according to embodiment 30, further containing the steps of repeating steps D to G.

32. A computer-implemented method for evidencing the existence of a plurality of digital document containing the steps of:
   A. receiving a plurality of evidence keys during a first time period;
   B. generating a current checksum based on the plurality of evidence keys received during the first time period;
   C. storing the current checksum in a storage media;
   D. receiving a plurality of evidence keys during a second time period;
   E. generating a next checksum based on the plurality of evidence keys received during the second time period;
   F. storing the next checksum in the storage media; and
   G. replacing the checksum in the storage media with the next checksum.

33. The method according to embodiment 32, further containing the steps of repeating steps D to G.

34. A computer-implemented method for evidencing the existence of a plurality of digital documents containing the steps of:
   A. receiving a plurality of cryptographic hashes during a first time period;
   B. generating a current checksum based on the plurality of cryptographic hashes received during the first time period;
   C. storing the current checksum in a storage media;
   D. receiving a plurality of cryptographic hashes during a second time period;
   E. generating a current checksum based on the plurality of cryptographic hashes received during the second time period;
   F. storing the current checksum in the storage media;
   G. receiving a plurality of cryptographic hashes during a next time period;
   H. generating a next checksum based on the plurality of cryptographic hashes received during the next time period and the current checksum from step B;
   I. storing the next checksum in a storage media;
   J. replacing the current checksum stored in step C with the next checksum stored in step I;
   K. receiving a plurality of cryptographic hashes during a next time period;
   L. generating a next checksum based on the plurality of cryptographic hashes received during the next time period and the current checksum from step E;
   M. storing the next checksum in a storage media; and
   N. replacing the current checksum stored in step F with the next checksum stored in step M.

35. The method according to embodiment 34, further containing the steps of repeating steps G to N.

36. A computer system for evidencing the existence of a digital document, the system comprising the method according to any one of the preceding embodiments.

37. A computer-implemented tag chain system having:
   A. a first chain; and
   B. a second chain,
   wherein the first chain and the second chain are mutually-exclusive.

38. The tag chain system according to Embodiment 37, wherein the first chain and the second chain are stored on the same server.

39. The tag chain system according to Embodiment 38, wherein the first chain and the second chain are stored on different servers.

It should also be understood that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable subcombination.

All references specifically cited herein are hereby incorporated by reference in their entireties. However, the citation or incorporation of such a reference is not necessarily an admission as to its appropriateness, citability, and/or availability as prior art to/against the present invention.

What is claimed is:

1. A computer-implemented method for evidencing the existence of a digital document comprising the steps of:
   A. obtaining a time stamp of the digital document, wherein the time stamp of the digital document is selected from the group consisting of the time when the digital document was created, the time when the digital document was last saved, and a combination thereof;
   B. obtaining a cryptographic hash of the digital document;
   C. at an evidence key generator, generating an evidence key based on the time stamp and the cryptographic hash;
   D. sending the evidence key to a receiving server;
   E. providing additional associated data, wherein the additional associated data comprises a storage time stamp and wherein the storage time stamp is obtained from a time source selected from the group consisting of a time server, an independent clock, and a combination thereof; and
   F. storing the evidence key and the associated additional data on a storage server to provide a stored evidence key, wherein storing the evidence key comprises storing the evidence key on a plurality of storage media.

2. The method according to claim 1, further comprising the step of:
   G. retrieving the evidence key to provide a retrieved evidence key.

3. The method according to claim 2, further comprising the step of:
   H. comparing the stored evidence key to the retrieved evidence key.

4. The method according to claim 3, wherein the comparing step results in a retrieval request result.

5. The method according to claim 1, wherein step (B) comprises the step of:
   obtaining a plurality of cryptographic hashes of the digital document.

6. The method according to claim 1, wherein the time stamp comprises the time when the digital document was last saved.

7. The method according to claim 1, wherein the time stamp comprises the time when the digital document was created.

8. The method according to claim 1, further comprising the step of transmitting the evidence key from the evidence key generator to the receiving server.

9. The method according to claim 8, wherein the transmitting step occurs over the Internet.

10. The method according to claim 1, wherein one or more of the plurality of storage media is held by a trusted organization.

11. The method according to claim 10, wherein the trusted organization is selected from the group consisting of The Austrian Patent Office, The China Council for the Promotion of International Trade, The European Patent Office, The Intellectual Property Office of Singapore, The International Intellectual Property Commercialization Council, The State Intellectual Property Office, The Swiss Federal Institute of Intellectual Property, the United States Patent and Trademark Office, The State Market Supervision Administration, The World Intellectual Property Office, the United States Library of Congress, and a combination thereof.

12. The method according to claim 1, further comprising the steps of:
   a party providing an evidence key request to the evidence key generator;
   delivering the evidence key and the additional associated data together to the account of the party to form a delivered evidence key.

13. The method according to claim 12, wherein the delivering step comprises transmission over the internet.

14. The method according to claim 1, wherein storing of the associated data comprises storing the associated data on a plurality of storage media.

15. The method according to claim 1, wherein the additional associated data includes a software version number for the version of the software which was used to generate the evidence key.

16. The method according to claim 1, wherein the additional associated data contains data used to search for the evidence key, typically at a time after the storage thereof.

17. A computer system for evidencing the existence of a digital document, the system comprising at least one non-transitory computer-readable medium having computer program instructions stored thereon, the computer program instructions being executable by at least one computer processor to perform a method, the method comprising:
   A. obtaining a time stamp of the digital document, wherein the time stamp of the digital document is selected from the group consisting of the time when the digital document was created, the time when the digital document was last saved, and a combination thereof;
   B. obtaining a cryptographic hash of the digital document;
   C. generating an evidence key based on the time stamp and the cryptographic hash;
   D. sending the evidence key to a receiving server;
   E. providing additional associated data, wherein the additional associated data comprises a storage time stamp and wherein the storage time stamp is obtained from a time source selected from the group consisting of a time server, an independent clock, and a combination thereof; and
   F. storing the evidence key and the associated additional data on a storage server to provide a stored evidence key, wherein storing the evidence key comprises storing the evidence key on a plurality of storage media.

18. The computer system of claim 17, wherein the method further comprises:
   transmitting the evidence key from an evidence key generator to a receiving server;
   wherein the transmitting step occurs over the Internet.

19. The computer system of claim 17, wherein the method further comprises:
   a party providing an evidence key request to an evidence key generator;
   delivering the evidence key and the additional associated data together to the account of the party to form a delivered evidence key.

20. The method according to claim 1, wherein storing the associated data comprises storing the associated data on a plurality of storage media.

* * * * *

UNITED STATES PATENT AND TRADEMARK OFFICE
CERTIFICATE OF CORRECTION

| | |
|---|---|
| PATENT NO. | : 11,177,940 B2 |
| APPLICATION NO. | : 16/622824 |
| DATED | : November 16, 2021 |
| INVENTOR(S) | : Johnson Zone An Kong et al. |

It is certified that error appears in the above-identified patent and that said Letters Patent is hereby corrected as shown below:

In the Claims

Column 26, Claim 20 should read: The system according to claim 17, wherein storing the associated data comprises storing the associated data on a plurality of storage material.

Signed and Sealed this
Seventh Day of June, 2022

*Katherine Kelly Vidal*

Katherine Kelly Vidal
*Director of the United States Patent and Trademark Office*